(12) United States Patent
Devlin et al.

(10) Patent No.: US 8,266,009 B1
(45) Date of Patent: Sep. 11, 2012

(54) AUCTION OPTIMIZATION SYSTEM

(75) Inventors: Bryan Kerry Devlin, Los Altos, CA (US); Mark Hill, Los Altos, CA (US)

(73) Assignee: Earthtrax, Inc., Los Altos, CA (US)

( * ) Notice: Subject to any disclaimer, the term of this patent is extended or adjusted under 35 U.S.C. 154(b) by 1318 days.

(21) Appl. No.: 10/646,096

(22) Filed: Aug. 22, 2003

(51) Int. Cl.
*G06Q 40/00* (2012.01)

(52) U.S. Cl. .......................... 705/26.3; 705/37

(58) Field of Classification Search ............... 705/35–40
See application file for complete search history.

(56) References Cited

U.S. PATENT DOCUMENTS

| | | | |
|---|---|---|---|
| 7,340,428 B1 * | 3/2008 | White et al. ................... 705/37 |
| 2001/0034694 A1 * | 10/2001 | Elias .............................. 705/37 |
| 2001/0044771 A1 * | 11/2001 | Usher et al. ................... 705/37 |
| 2002/0049664 A1 * | 4/2002 | Hoffman et al. .............. 705/37 |
| 2002/0059132 A1 * | 5/2002 | Quay et al. .................... 705/37 |
| 2002/0065826 A1 * | 5/2002 | Bell et al. ...................... 707/10 |
| 2002/0082977 A1 * | 6/2002 | Hammond et al. ............ 705/37 |
| 2002/0120552 A1 * | 8/2002 | Grey et al. .................... 705/37 |
| 2002/0165817 A1 * | 11/2002 | Rackson et al. .............. 705/37 |
| 2002/0174052 A1 | 11/2002 | Guler |
| 2003/0014349 A1 | 1/2003 | Guler |
| 2003/0018515 A1 | 1/2003 | Guler |
| 2003/0018562 A1 | 1/2003 | Guler |
| 2003/0055773 A1 * | 3/2003 | Guler et al. ................... 705/37 |
| 2003/0069740 A1 * | 4/2003 | Zeidman ........................ 705/1 |
| 2003/0093357 A1 | 5/2003 | Guler |
| 2003/0130930 A1 * | 7/2003 | Miura et al. ................... 705/37 |
| 2003/0182250 A1 * | 9/2003 | Shihidehpour et al. ......... 706/21 |

OTHER PUBLICATIONS

Procuri.com Announces E-Procurement Service Capabilities, PR Newswire, Dec. 10, 2000.*
Normalization, Academic Press Dictionary of Science and Technology, 1996.*

* cited by examiner

*Primary Examiner* — Thomas M Hammond, III
(74) *Attorney, Agent, or Firm* — Mark J. Spolyar; Joseph L. Acayan

(57) ABSTRACT

Methods, apparatuses and systems directed to an auction optimization system that assists users in determining one or more parameters associated with a planned auction. In one embodiment, the auction optimization system computes a predicted final auction price for a given item based on historical auction data associated with the same or similar items. In other embodiments, the auction optimization system is operative to compute suggestions for various auction parameters, such as starting price, start time, duration, and reserve price. In certain embodiments, the auction optimization system uses novel data gathering techniques that minimize the load on on-line auction facilities and gather data in a manner consistent with the use policies associated with on-line auction facilities.

18 Claims, 15 Drawing Sheets

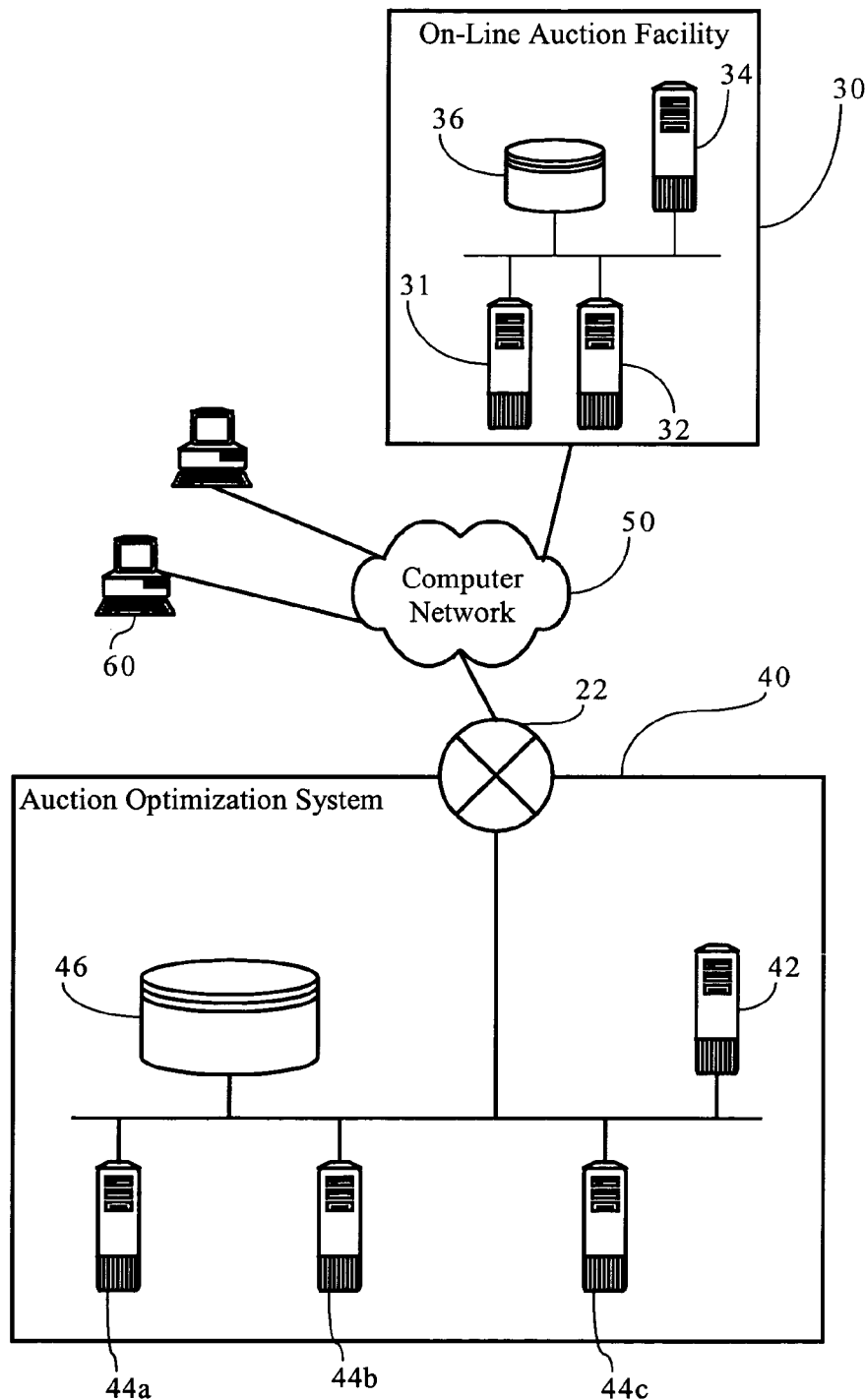
Fig._1

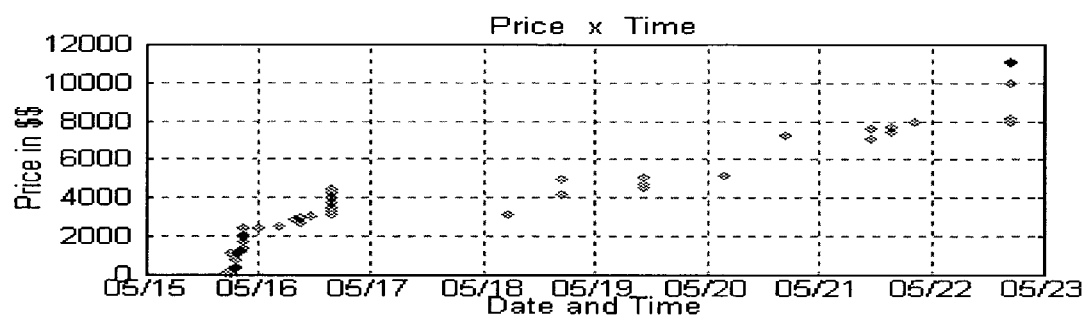
Fig._2
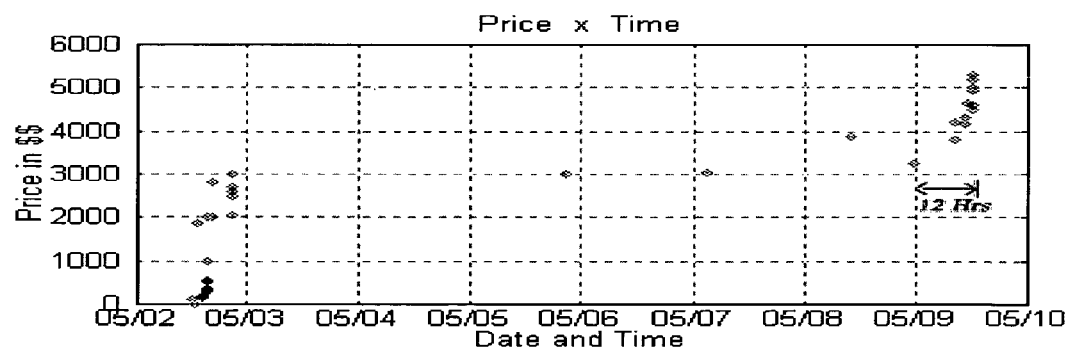
Fig._3

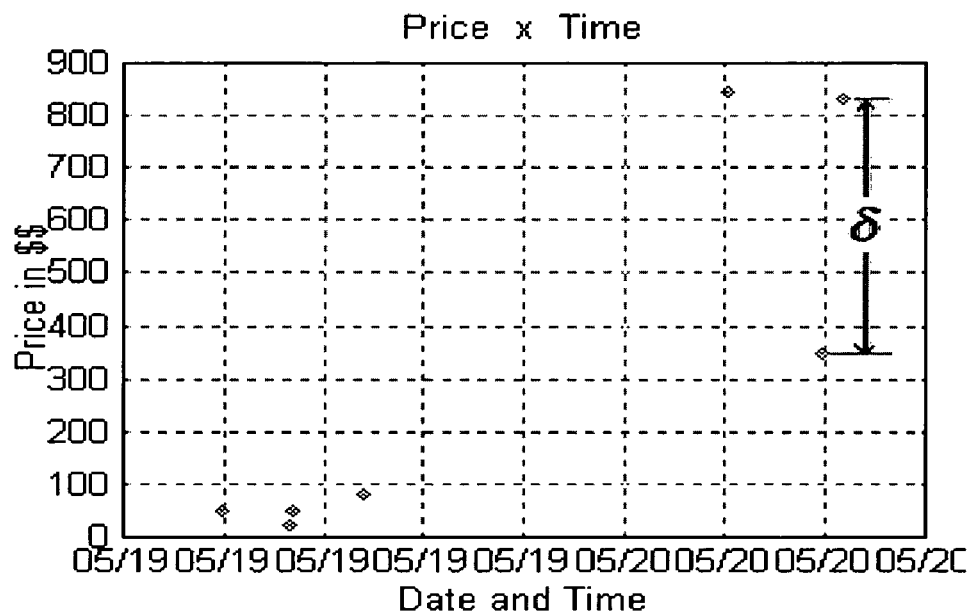
Fig._4
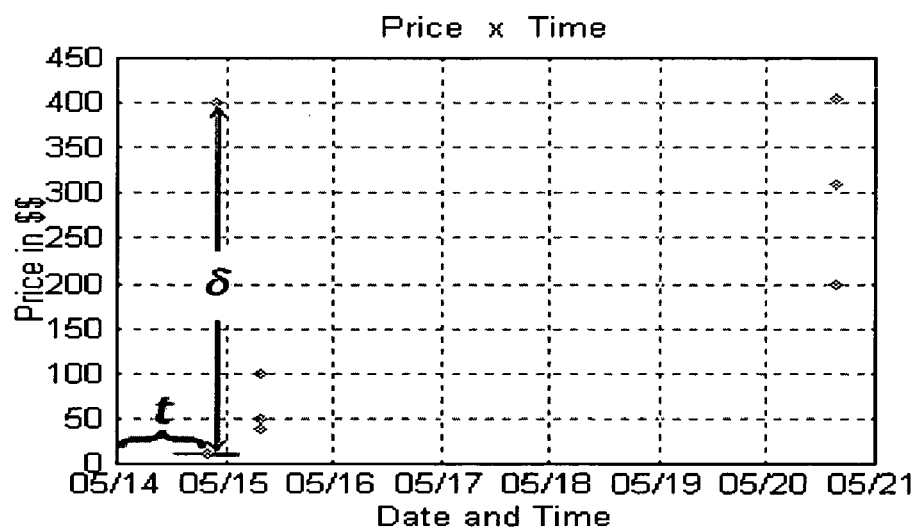
Fig._5

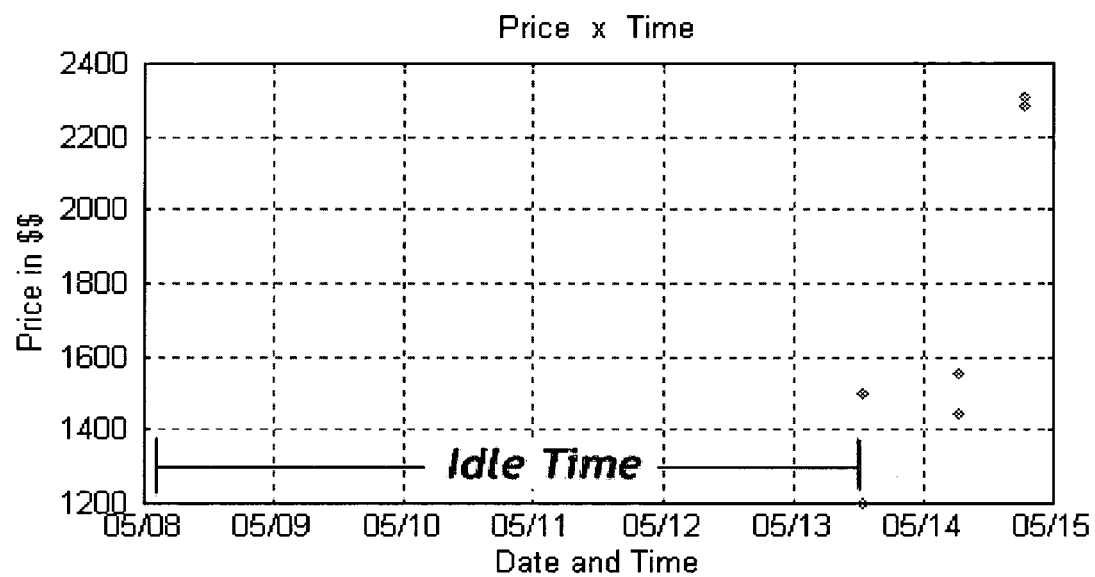
Fig. _6
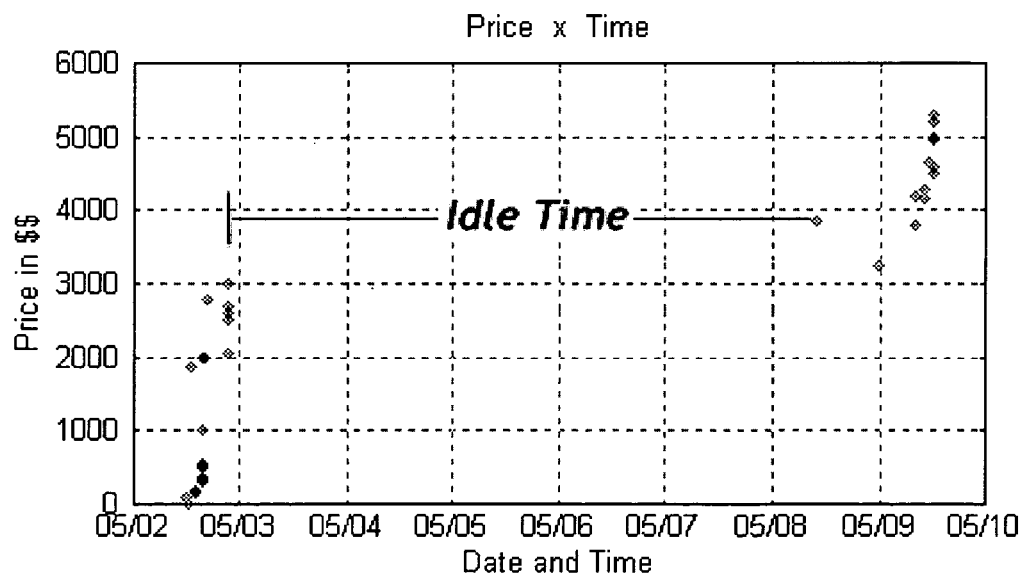
Fig. _7

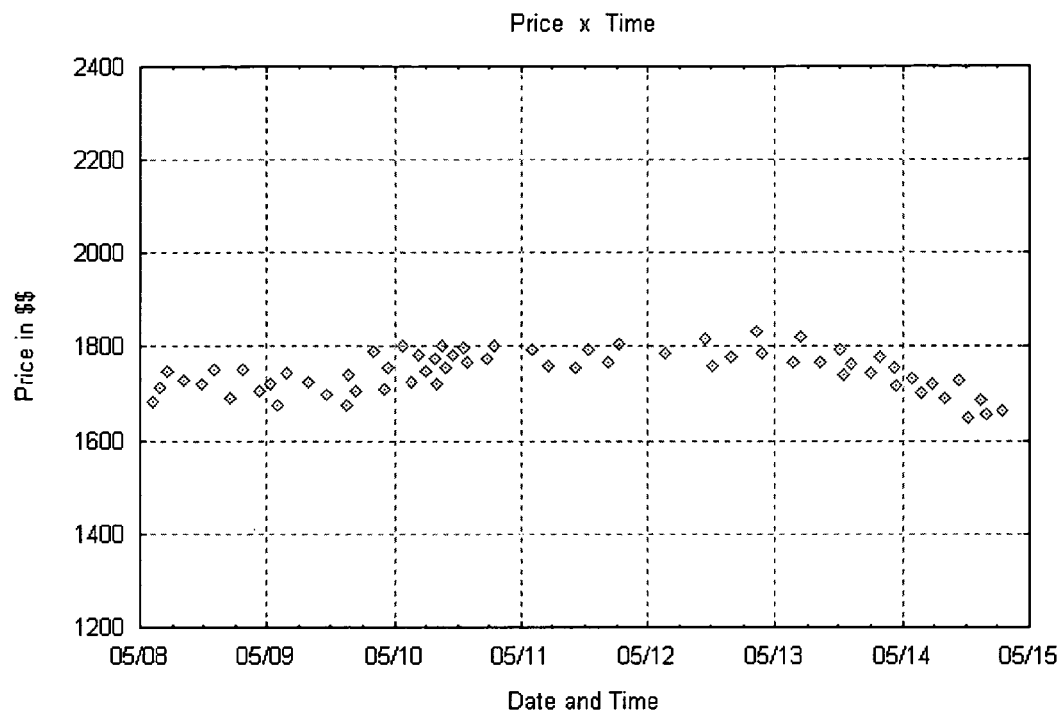
Fig._8
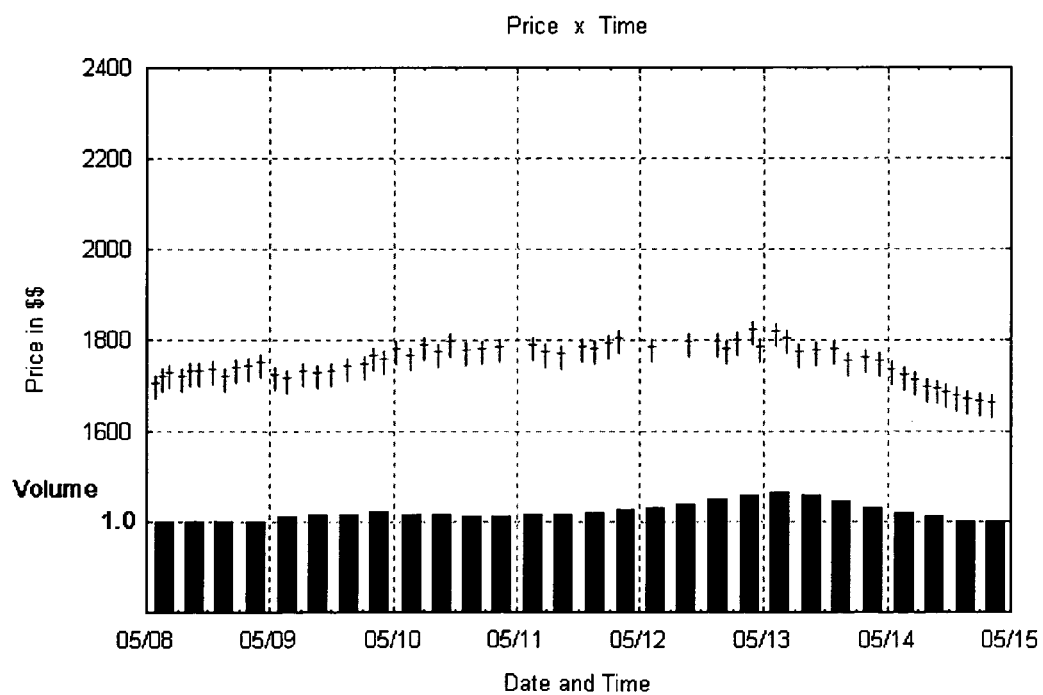
Fig._9

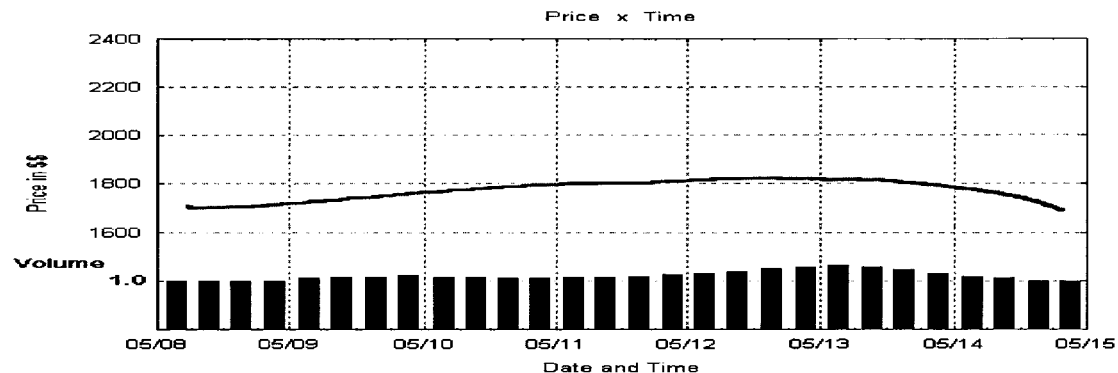
Fig._10
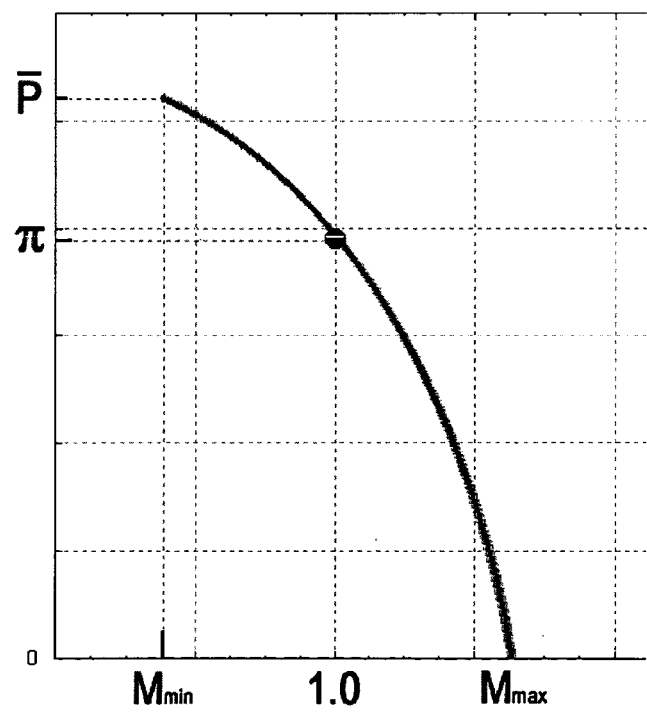
Fig._11

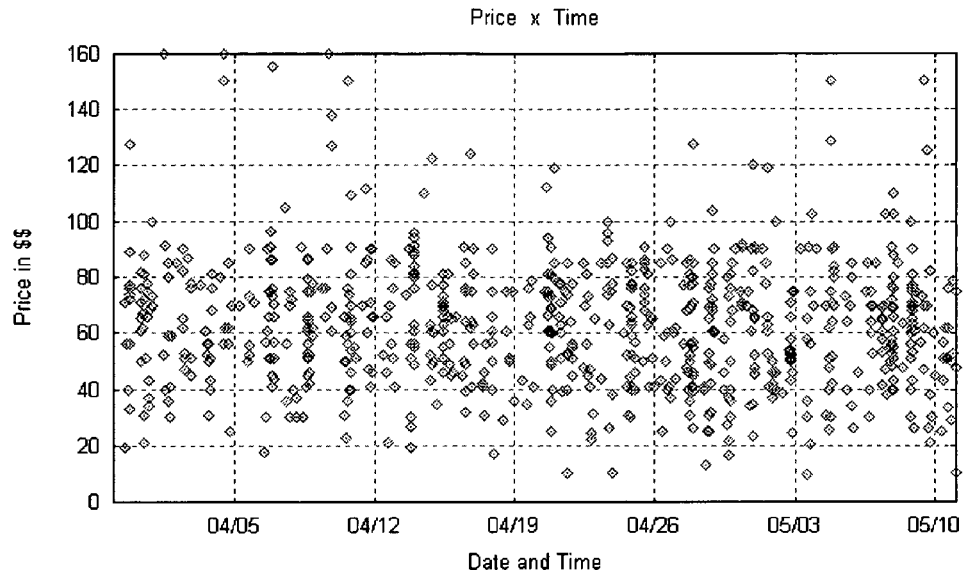
Fig._17
| | | | | | |
|---|---|---|---|---|---|
| Currently | $405.00 | | First bid | $9.99 | |
| Quantity | 1 | | # of bids | 8 | |
| Time left | Auction has ended. | | | | |
| Started | May-14-03 15:19:33 PDT | | | | |
| Ends | May-20-03 15:19:33 PDT | | | | |
| Seller (Rating) | xxx | | | | |
| Name | Bid | Price Diff. | % of Final | | Time Left (days) |
|---|---|---|---|---|---|
| Bidder1 | 405.00 | | | May-20-03 15:19:33 PDT | 0.0000 |
| Bidder7 | 310.00 | ? = 95 | 23.45 | May-20-03 15:17:45 PDT | 0.0024 |
| Bidder6 | 200.00 | ? = 110 | 27.16 | May-20-03 15:16:56 PDT | 0.0017 |
| Bidder5 | 100.21 | ? = 99.79 | 24.63 | May-15-03 07:27:35 PDT | 5.215 |
| Bidder4 | 50.02 | ? = 50.19 | 12.39 | May-15-03 07:26:31 PDT | 5.213 |
| Bidder3 | 37.03 | ? = 12.99 | 3.20 | May-15-03 07:25:48 PDT | 5.212 |
| Bidder2 | 400.00 | ? = −362.97 | −− | May-14-03 21:54:42 PDT | 6.719 |
| Bidder1 | 10.00 | ? = 390 | 96.27 | May-14-03 19:38:53 PDT | 6.820 |
Fig._19

Example 1:

| | | | |
|---|---|---|---|
| Currently | $102.50 | First bid | $9.99 |
| Quantity | 1 | # of bids | 25 |
| Time left | Auction has ended. | | |
| Started | Jun-17-03 18:00:00 PDT | | |
| Ends | Jun-24-03 18:00:00 PDT | | |
| Seller (Rating) | xxx | | |

| Bidder | Bid Price | Bid Date |
|---|---|---|
| xx(0) | $102.50 | Jun-24-03 17:59:58 PDT |
| xx(9) | $100.00 | Jun-23-03 21:26:57 PDT |
| xx(9) | $100.00 | Jun-24-03 17:59:09 PDT |
| cx(8) | $95.00 | Jun-24-03 15:27:51 PDT |
| cx(8) | $85.00 | Jun-24-03 14:29:56 PDT |
| xx(4) | $77.00 | Jun-24-03 11:19:17 PDT |
| jt(7) | $75.00 | Jun-23-03 20:43:22 PDT |
| co(2) | $70.00 | Jun-21-03 07:55:48 PDT |
| jh(4) | $65.00 | Jun-21-03 19:39:10 PDT |
| jh(4) | $63.00 | Jun-21-03 19:38:37 PDT |
| jh(4) | $61.00 | Jun-21-03 19:37:49 PDT |
| jh(4) | $59.00 | Jun-21-03 19:37:12 PDT |
| jh(4) | $56.00 | Jun-21-03 19:36:19 PDT |
| jh(4) | $54.00 | Jun-21-03 19:35:19 PDT |
| jh(4) | $52.00 | Jun-18-03 14:24:30 PDT |
| vp(1) | $50.00 | Jun-18-03 07:16:41 PDT |
| jh(4) | $50.00 | Jun-18-03 14:21:48 PDT |
| jh(4) | $45.00 | Jun-18-03 14:20:18 PDT |
| jh(4) | $40.00 | Jun-18-03 14:19:01 PDT |
| jh(4) | $35.00 | Jun-18-03 14:18:23 PDT |
| jh(4) | $25.00 | Jun-18-03 14:17:46 PDT |
| sa(6) | $18.00 | Jun-18-03 09:28:37 PDT |
| sa(6) | $15.00 | Jun-18-03 09:28:09 PDT |
| pi(4) | $10.49 | Jun-18-03 02:54:48 PDT |
| ca(9) | $10.00 | Jun-17-03 23:18:52 PDT |

Fig._18

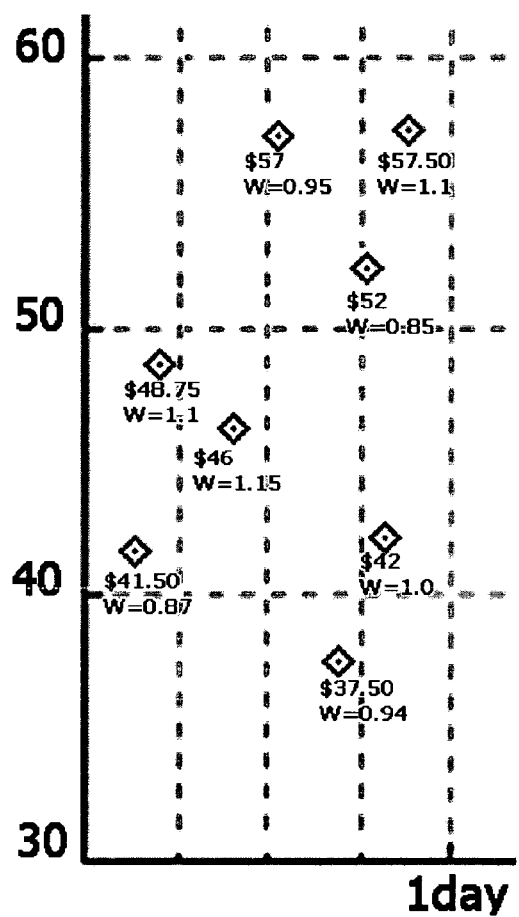
Fig._20
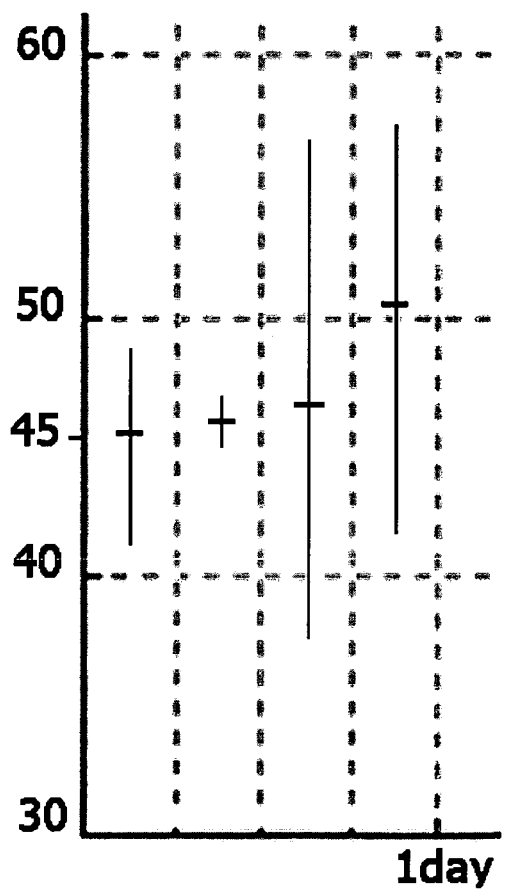
Fig._21

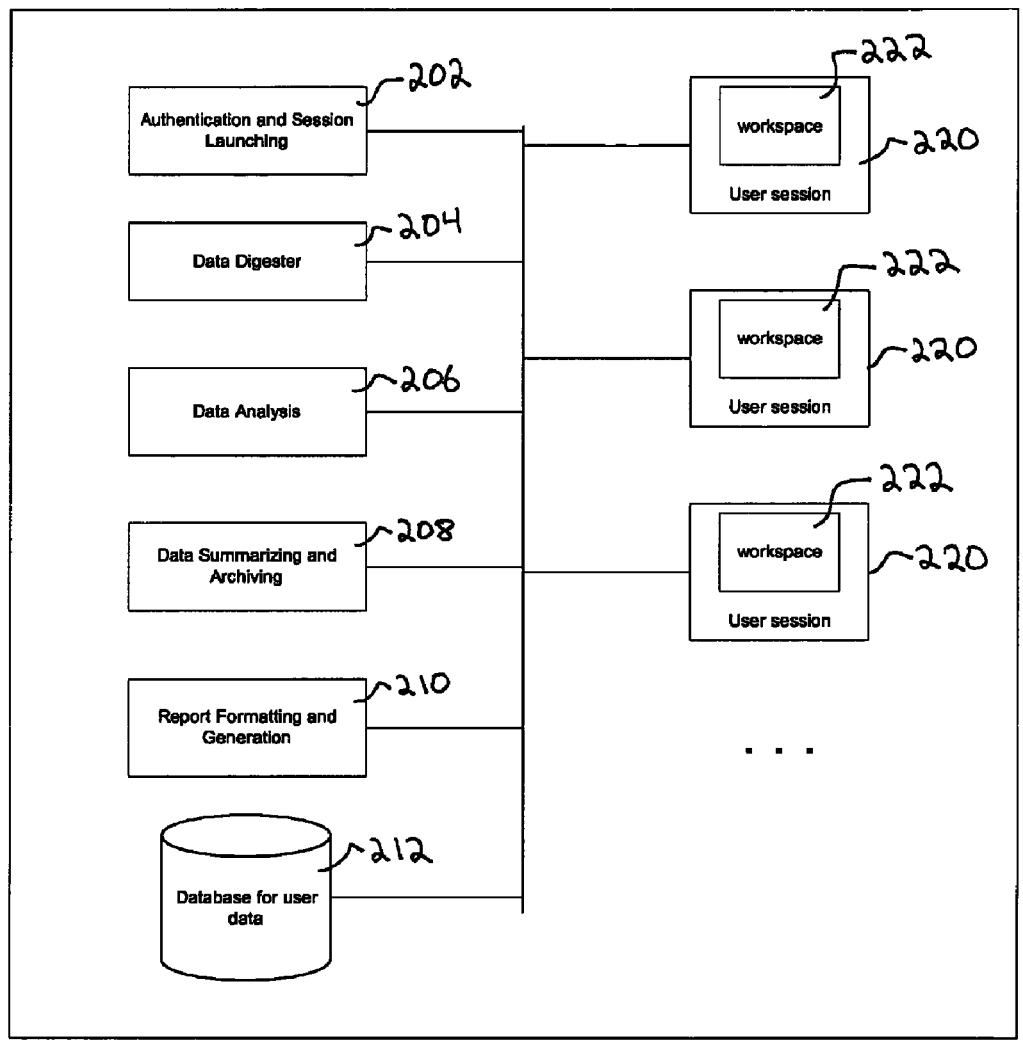
Fig._22

AUCTION OPTIMIZATION SYSTEM

FIELD OF THE INVENTION

The present invention relates to auctions and, more particularly, to methods, apparatuses and systems facilitating a determination of the optimal parameters associated with contemplated auctions. Embodiments of the present invention are especially adapted to predict a final auction price for a given item, and in other embodiments, to assist users in planning auctions—especially, determining optimal auction parameters, such as start price, length of auction, etc., for achieving the highest price for goods or services offered in on-line auctions.

BACKGROUND OF THE INVENTION

On-line transaction and auctions systems are known. For example, eBay.com of San Jose, Calif. hosts an enormously popular on-line auction facility allowing users to auction and buy a wide variety of items, such as automobiles, electronics and services. Of course, there are a vast array of on-line auction facilities, some of which are highly specialized to a particular category, such as firearms, automobiles, and the like. To facilitate and promote their use, such on-line auction facilities offer tools and functionality to assist the user. For example, on-line auction facilities post buying and selling tips, as well as generalized descriptions of the on-line auction process and available options, such as reserve and "buy-it-now" prices. On-line auction facilities also offer tools that facilitate tracking and management of items being sold by a particular user.

While the on-line auction facilities assist the user in posting auctions and/or placing bids, such on-line auction facilities do not offer functionality directed to computing or suggesting optimal auction parameters to achieve the highest price. For example, the prior art does not disclose or suggest a system that allows the use to predict the final auction price for a given item. In addition, the prior art does not disclose or suggest a system that computes auction parameters intended to achieve the highest final auction price. Rather, the user, especially un-experienced or novice users, are left to guess at a suitable starting price and duration for a contemplated auction. Embodiments of the present invention substantially fulfill these needs.

SUMMARY OF THE INVENTION

The present invention provides methods, apparatuses and systems directed to an auction optimization system that assists users in determining one or more parameters associated with a planned auction. In one embodiment, the auction optimization system computes a predicted final auction price for a given item based on historical auction data associated with the same or similar items. In other embodiments, the auction optimization system is operative to compute suggestions for various auction parameters, such as starting price, start time, duration, and reserve price. In certain embodiments, the auction optimization system uses novel data gathering techniques that minimize the load on on-line auction facilities and gather data in a manner consistent with the use policies associated with on-line auction facilities.

DESCRIPTION OF THE DRAWINGS

FIG. 1 is a functional block diagram illustrating a computer network environment in which an embodiment of the present invention operates.

FIG. 2 is a bid history plot of bid price over time in an auction for a given item.

FIG. 3 is second bid history plot of bid price over time in an auction for a given item.

FIG. 4 is a third bid history plot featuring a large difference in bid price between two consecutive bids.

FIG. 5 is a fourth bid history plot including a high bid placed early in the auction.

FIG. 6 is a fifth bid history plot showing substantial idle time between the start of the auction and the first bid.

FIG. 7 is a sixth bid history plot illustrating idle time between two bids during the middle of a given auction.

FIG. 8 is a plot of final auction price over time for a data set comprising a plurality of past, completed auctions.

FIG. 9 is a plot of final auction price and volume over time resulting from the normalization of the data in FIG. 8 to a form suitable for use in connection with financial analysis methods.

FIG. 10 is a plot of the data plotted in FIG. 9 where a spline formula has been applied to provide a curve approximating the behavior of the price data.

FIG. 11 is a graph illustrating operation of a suggested starting price formula according to an embodiment of the present invention.

FIG. 17 is a graph of final auction price data over time for auctions in a given data set.

FIG. 18 provides the bid history associated with a given auction.

FIG. 19 provides the bid history associated with another auction.

FIG. 20 is a graph of weighted auction price data over time.

FIG. 21 is a graph of average weighted auction price data over particular time intervals.

FIG. 22 is a functional block diagram illustration the functionality of an application server according to an embodiment of the present invention.

DETAILED DESCRIPTION OF PREFERRED EMBODIMENT(S)

A. Operating Principles

Figure 12:
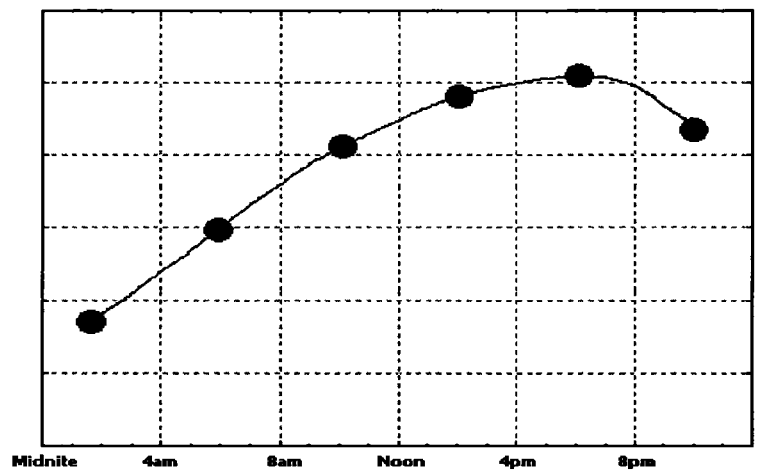
FIG. 12 is a graph illustrating weighted average final auction price as a function of auction start or end time.

As discussed in more detail below, the auction optimization system 40, according to embodiments of the present invention, analyzes auction data characterizing one or more attributes of successfully completed auctions, such as winning bid price and bid histories, and provides the user with a report containing a predicted final auction price and/or suggesting one or more auction parameters, such as a starting price, a reserve price, a starting time, and a duration.

As used herein, all summations, such as $$\sum_{i}^{n} f(i)$$

characteristics begin an iteration with i=1, unless otherwise stated. In addition, the computations set forth below refer to certain constants k and $N_{1...6}$. The constants can be set to a variety of values to achieve different behavioral models and, in one embodiment, are heuristically and/or empirically determined based on an analysis of historical auction data.

A.1. Analysis and Weighting of Past, Completed Auction Data

In one embodiment, the auction optimization system 40 analyzes the bid histories associated with completed auctions related to an item of interest to compute one or more auction parameters. In one embodiment, the auction optimization system 40 assigns a weighting to each auction based on one or more attributes of the bid history associated with the auction. As discussed in more detail below, the weightings computed for each auction are used in connection with the corresponding final auction price for each item. In one embodiment, the bid history attributes analyzed by the auction optimization system 40 include: 1) number of total bids, 2) number of bids placed during last 12 hours of auction, 3) largest change in bid amount, 4) timing of higher bids, 5) absolute idle time between start of auction and first bid, and 6) absolute idle time during middle and end of auction period. Of course, additional or alternative auction attributes can be incorporated into the analysis. Auction optimization system 40, in one embodiment, analyzes each factor separately and assigns a factor weighting. These factor weightings are then averaged to achieve an average weighting for each auction, which, in essence, characterizes the relevance of the particular auction to the prediction of the final auction price for the item of interest.

A.1.a. Number of Total Bids

FIG. 2 plots, for didactic purposes, the bid price over time for a particular auction. The number of total bids placed over the entire course of an auction indicates greater demand for the item. Auction optimization system 40, in one embodiment, computes a factor weighting, $W_1$, based on the number of total bids based on the following equation:

$$W_1 = k + N_1 \cdot (b - b_{avg} - \lambda \cdot (Q-1)),$$

where
- k is a constant used throughout the factor weighting computations;
- $b_{avg}$ is the average number of bids over a known set of bid histories;
- b is the number of bids for the current auction;
- $\lambda$ is an adjustable constant for Buy-It-Now quantities;
- Q is the quantity of items in this auction (usually =1); and
- $N_1$ is a normalization constant for the factor weighting, $W_1$.

The typical number of items offered, Q, in a given auction is 1. Accordingly, $\lambda \cdot (Q-1)$ usually resolves to zero. However, the term $\lambda \cdot (Q-1)$ is useful as it takes into account some "Buy-It-Now" auctions for multiple quantities of a given item.

A.1.b. Number of Bids within Last Twelve Hours

Auction optimization system 40, in one embodiment, computes a factor weighting based on the number of bids placed within the last 12 hours of each auction. FIG. 3 illustrates a bid history where a large portion of the total bids were placed during the last stage of the auction. At this stage of the auction, it can become a psychological game where a bidder tries to outbid the others, whether or not that bidder really wants the product. Auction optimization system 40, in one embodiment, computes a factor weighting, $W_2$, based on the number of total bids within the last twelve hours of each auction, based on the following equation:

$$W_2 = k + N_2 \cdot (l - l_{avg}),$$

where
- k is a constant used throughout;
- $l_{avg}$ is the average number of bids during the last 12 hours over a known set bid histories, where bid >0;
- l is the number of bids for the auction during last 12 hours; and
- $N_2$ is a normalization constant for the factor weighting, $W_2$.

A.1.c. Change in Auction Price

Auction optimization system 40, in one embodiment, also computes a factor weighting based on the difference in bid prices for a given auction to identify if one or more bidders display a strong interest in the item for auction. In one embodiment, if one bid is larger specifically than the previous by a given amount (say, typically 25%), then this would constitute a higher weighting for the overall auction price. In the example of FIG. 4, at least 2 people really exhibit a strong desire for the item and do not appear concerned about what a reasonable final price might be. Note that the bid history depicted in FIG. 4 illustrates a situation where a higher bid was followed by a lower bid. This situation is actually quite common when one considers the practice of some on-line auction sites, such as eBay, Inc. of San Jose, Calif. According to this practice, a bidder may enter a bid price substantially higher than the current bid price. However, the new bid price displayed to subsequent users is only a small increment above the last bid price. Accordingly, given the example of FIG. 4, the bidder who entered a bid price of $350 would have seen a bid price of approximately $100. In addition, the auction system, after the $350-bid would have displayed the subsequent bid price at $375 or some other incremental value above $350. The actual bid prices are revealed at the close of the auction.

In one embodiment, auction optimization system 40 formulates, for each auction, a table of price differences between the $i^{th}$ and $(i+1)^{th}$ auction bid price, and then sorts the price differences in descending order, labeling each price difference as $D_i$, where $i \leq 1$ and $D_1$ is the highest price difference between bids. Auction optimization system 40 then compares the price difference, $D_i$, over the final auction price, $P_f$, to a threshold value, $\delta$, and uses only the price differences crossing the threshold in computing the weighting factor, $W_3$.

In one embodiment, auction optimization system 40 computes weighting factor, $W_3$, according to the following formulas:

$$\forall D_i \ni \left(100 \cdot \frac{D_i}{P_f}\right) \geq \delta, \; 10 \leq \delta \leq 50 \rightarrow$$

$$W_3 = k + N_3 \cdot \sum \left(100 \cdot \frac{D_i}{P_f} - \delta\right);$$

where
- k—Constant used throughout;
- $N_3$—Normalization constant for weighting factor $W_3$;
- $D_i$—Price difference of bid prices in history of auction;
- $P_f$—Final bid price for this auction; and δ—Threshold constant for bid differences as a percentage (in one embodiment, δ=25 percent; however, can be any suitable percentage value).

A.1.d. Time Value of Higher Bids

Auction optimization system 40 further computes a factor weighting based on the timing of the higher bids in a bid history. FIG. 5 illustrates a bid history where a bidder placed a high bid early in the auction. If higher bids are placed earlier, this generally means that at least one bidder wants has special interest in the item and is not particularly concerned with the ultimate price. In one embodiment, auction optimization system 40 sorts the bids in the bid history based on the time of the bid from earliest bid to last bid. Auction optimization system 40 then creates a table of the price differences between the $i^{th}$ and $(i+1)^{th}$ auction bid price from the sorted list of bids. It is important to note that only relevant price deltas are the positive ones. Auction optimization system 40 then compares the difference in price, $D_i$, relative to the final auction price $P_f$ to a threshold value, δ (in one embodiment, δ=25). As the following formulas provide, auction optimization system 40 first selects the set of price differences that exceed the threshold, δ, and then computes the weighting factor, $W_4$.

$$\exists D_i \ni \left(100 \cdot \frac{D_i}{P_f}\right) \geq \delta, 10 \leq \delta \leq 50 \rightarrow$$

$$W_4 = k + N_4 \cdot \sum \left(100 \cdot \frac{D_i}{P_f}\right) \cdot (T_A - t_i),$$

where k is a constant used throughout;

$N_4$ is a normalization constant for weighting factor, $W_4$;

$D_i$ is the price difference of bid prices between the $i^{th}$ and $(i+1)^{th}$ auction bid price, from the sorted increasing timestamp list;

$P_r$ is the final bid price for this auction;

$T_A$ is the total time duration of the auction;

$t_i$ is the time for start of bid I;

δ is a threshold constant for bid differences as a percentage of the final bid price (e.g., $10 \leq \delta \leq 50$); in one embodiment, δ=25 (percent).

As the equation provides, if no price delta crosses this threshold percentage, $W_4$ equals k.

A.1.e. Absolute Idle Time at Start of Auction

In one embodiment, auction optimization system 40 computes a weighting factor, $W_5$, based on the amount of absolute idle time at the beginning of each auction. FIG. 6 illustrates an auction with a relatively long idle time until the first bid. As the formula below indicates, the longer the idle time, the lower the factor weighting for the auction. Longer initial idle times usually mean that the auction was set at the wrong price, at a wrong time of day, or wrong time of year. Auction optimization system 40, in one embodiment, applies the formula below to compute factor weighting, $W_5$. For a constant flow of bids throughout the auction, $W_5$ will generally be >k, otherwise for bid histories similar to that shown in FIG. 6, $W_5$ will be <k.

$$W_5 = k - N_5 \cdot (I_B - \alpha T_A),$$

where k—Constant used throughout;

$N_5$—Normalization constant for weighting factor $W_5$;

$I_B$—Idle time from auction start to first bid;

α—αT denotes the typical length of time when the first bid would occur. (in one embodiment, α=0.14; but can be any empirically determined value); and $T_A$—Total time duration of auction.

A.1.f. Idle Time In Middle or at End of Auction

Auction optimization system 40, also computes a factor weighting, $W_6$, based on the observed idle time in the middle, or at the end of, an auction. FIG. 7 illustrates a bid history where there is appreciable idle time in the middle of the auction. This usually means that the auction has not generated any interest from many more people, beyond those who found the auction during the first and last 12 hours of posting. After sorting the bid history in chronological order of bid placement, auction optimization system 40 calculates the idle time as time differences between bid placement, and uses the maximum value (after the first bid) of this calculation as $I_E$ for the factor weighting calculation. Here, the number of bids placed is assumed to be greater than, or equal to, 2, otherwise $W_6$ will simply be equal to the constant 'k'. Auction optimization system 40, in one embodiment, applies the formula below to compute factor weighting, $W_6$. As above, for a constant flow of bids throughout the auction, $W_6$ will generally be less than k, otherwise for bid histories similar to that shown in FIG. 6, $W_6$ will be less than k.

$$W_6 = k - N_6 \cdot (I_E - \beta T_A),$$

where k—Constant used throughout;

$N_6$—Normalization constant for weighting factor, $W_6$;

$I_E$—Maximum idle time in the middle or at the end of auction;

β—βT denotes the typical length of idle in the middle or end of an auction (in one embodiment, β=0.40; however, any empirically determined value can be used); and $T_A$—Total time duration of auction.

Total Number of Bids $\geq 2$.

A.2. Weighted Auction Price and Normalization of Weighted Auction Data

As discussed above, auction optimization system 40 computes, for each completed auction in the analysis set, a weighted auction price based on the final auction price and an average weighting as described in more detail below. In one embodiment, using the above-identified weighting formulas for each successfully completed auction, auction optimization system 40 assigns a weighted average for the final auction based on a combination of the individual factor weightings discussed above. Auction optimization system 40 then normalizes the weighted auction price data to a format commonly used to analyze stocks. For example, over an analysis window (e.g., six weeks, 6 months, 1 year, etc.), auction optimization system 40 segregates the weighted final auction prices into desired time intervals, and then computes the average price and volume for the weighted final auction prices in each time interval. For example, for each evenly spaced time interval of the day (e.g., 4 hours), auction optimization system 40 can average the weighted final auction price to derive one price for that interval. For example, assuming the use of 4-hour time intervals, auction optimization system 40 proceeds with the following:

Let $\Omega_k$ represent the time interval for the $k^{th}$ duration of the day.

Then, averaging the above-identified factor weightings, for each completed auction, yields:

$$\overline{W}_i = \frac{\sum_{j=1}^{6} W_j}{6}$$

for each auction i in the time interval $\Omega_k$.

Accordingly, for both price, P, and volume, V, for each auction i in the time interval $\Omega_k$, auction optimization system 40 would derive the average price, $\overline{P}_k$, and volume, $\overline{V}_k$, as follows:

$$\exists P_i \in \Omega_k \rightarrow \overline{P}_k = \frac{\sum_i P_i \cdot \overline{W}_i}{\sum_i \overline{W}_i}$$

and, $$\exists V_i \in \Omega_k \rightarrow \overline{V}_k = \frac{\sum_i V_i \cdot \overline{W}_i}{\sum_i \overline{W}_i}$$

With the weighted price and volume for all auctions during the interval $\Omega_k$, auction optimization system 40 can compute and plot the $\overline{P}_k$ values to a graph over a desired analysis interval, depicted in FIG. 8. The resulting data can further be reduced to price/volume data over the analysis interval as shown in FIG. 9, which provides the average, high and low price normalized over each interval. In one embodiment, auction optimization system 40, optionally, applies a spline formula to smooth out the data to achieve the graph depicted in FIG. 10. From this data, auction optimization system 40 interpolates out a short time interval to achieve a predicted final auction price $P_{pred}$, using known financial analysis methods. Suitable financial analysis methods include, but are not limited to, simple moving averages, exponential moving averages, weighted moving averages, price oscillator indicators, moving average convergence divergence indicators, stochastic oscillators, percentage volume oscillators, and ultimate oscillators. Using such methods, auction optimization system 40 provides a forecast of the likely final auction price for the item of interest. In one embodiment, the auction optimization system 40 presents the user with graphical results allowing the user to predict a likely final auction price, and/or assess the desirability of offering the item for auction at the current time, as opposed to waiting a period of time. For example, given the trend associated volume, as well as the number of currently pending auctions, the user may decide to delay the auction at a time when the user's item may face less competition from similar or identical items. The user may also base this decision on price trends as for example the price trends depicted in FIGS. 13A and 13B. As discussed more fully below, this predicted price can also be used to compute a suggested starting price for the auction.

A.3. Computation of Suggested Starting Price

Auction optimization system 40, in one embodiment, further includes functionality directed to the computation of a suggested starting price for the item of interest. In one embodiment, computation of a suggested starting price is responsive to the anticipated demand for the item. In one embodiment, a higher anticipated demand results in a lower suggested starting price; similarly, a lower demand results in a higher suggested starting price. In one embodiment, auction optimization system 40 computes an average demand, $\overline{M}$, for the item over an analysis interval, $\Omega$, based on the average weighting associated with each auction in the analysis interval. In one embodiment, auction optimization system 40 takes the calculated values $\overline{W}_i$ for each of the auctions 'i' in the completed category and derives the following:

$$\exists \text{ auction } i \text{ and } \overline{W}_i \text{ in some time interval } \Omega, \text{ let } \overline{M} = \frac{\sum_i^n \overline{W}_i}{n}.$$

In one embodiment, the constant values used in connection with computing the factor weighting formulas described above are configured to ensure that $\overline{M}$ is normalized around the value 1.000, and that the range of $\overline{M}$ is between 0 and 2. The following defines the operating range for $\overline{M}$ according to an embodiment of the present invention:

1) $M_{min} < \overline{M} < M_{max}$;

2) $\frac{M_{min} + M_{max}}{2} = 1.000,$ and

3) $M_{min}$ and $M_{max}$ are equi-distant from 1.000.

Given the foregoing, let $\pi$ represent the fractional value of $P_{pred}$ when $\overline{M}=1.000$ (average 'demand'). This is the Start Price for the auction item when the normalized weight $\overline{M}=1.000$, which would be the average demand for that item. In one embodiment, $\frac{1}{2} P_{pred} \leq \pi \leq P_{pred}$; however, in one embodiment, a configured value for $\pi$ is $$\frac{2}{3} P_{pred}.$$

Accordingly, a suggested starting price can be derived from:

$$P_{start} = P_{pred} - \frac{P_{pred}}{(M_{max} - M_{min})^{\left(\frac{\log(\frac{1}{1-\pi})}{\log 2}\right)}} \cdot (\overline{M} - M_{min})^{\left(\frac{\log(\frac{1}{1-\pi})}{\log 2}\right)}$$

The graph depicted in FIG. 11 represents the above-identified formula. In one embodiment, auction optimization system 40 filters the suggested starting price as computed above to better suit the auction environment. For example, with a suggested starting price, auction optimization system 40 can adjust it if necessary to better suit the seller by comparing it against the table breakdown of listing fees by the hosting auction site. For example, Ebay.com's breakdown of current fees is the following:

| Starting Price, Opening Value or Reserve Price | Insertion Fee |
|---|---|
| $0.01 - $9.99 | $0.30 |
| $10.00 - $24.99 | $0.55 |
| $25.00 - $49.99 | $1.10 |
| $50.00 - $199.99 | $2.20 |
| $200.00 and up | $3.30 |

In one embodiment, auction optimization system 40 compares the generated $P_{start}$ value with the fee breakdown above.

If the start price is within a threshold value (e.g., $0.10, etc.) of the upper border of one of the listing fees, auction optimization system 40 suggests a starting price within the lower fee range, so that the user would have to pay a little less to initialize the auction. For example, if the start price derived by auction optimization system 40 is $50.09, then using the above table, one can see that it would cost $2.20 to list the auction. However, if the auction start price is set at $49.99, the cost to initiate the auction drops to $1.10.

A.4. Suggested Time Window for Auction

In one embodiment, auction optimization system 40 further includes functionality that computes a suggested time of day, or time range within a day, for beginning the contemplated auction. Note that auction durations are usually defined in 24-hour intervals, such as 3, 5, 7 and 10 days. Accordingly, the time of day at which at auction is started also corresponds to the time of day the auction ends.

FIG. 12 shows a plot of the number of auctions started during a given time interval over a given analysis window or interval (e.g., the last 60 days, etc.). In FIG. 12, each interval is a 4-hour time interval as shown; however, other time intervals, such as 24-hours, are used to compute other aspects of the time window. For example, to compute the best day of the week, a similar analysis is created using a 24-hour time period. In one embodiment, auction optimization system 40 essentially computes the most popular starting time for the auctions in the data set under the assumption that the past sellers, through their experiences, have settled on the best time to start the auction. Mathematically, this is represented by:

Best Time Window During The Day

Let $\Omega$ represent the adjustable time interval for this analysis (the analysis window or interval). In one embodiment, this is 60 days, but can be configurable by the user. Then, to find the best time window during the day, auction optimization system applies the following computation:

$$\forall s, s \in \left[1, 2, \ldots, \frac{24}{E}\right]; E = \# \text{ of hours per time window}$$

$$\rightarrow \text{MAX} \sum_{i=0}^{\Omega} \frac{\tau_s}{i+1}$$

Where $T_s$—Total no. of auctions during time window 's';
 i—Amount of time away from present time that $\overline{P}$ was calculated for time window 's'. This will be a whole number of days. For auction started on the current time, i=0.

Best Time Window During The Week

Let $\Omega$ represent the adjustable time interval for this analysis. In one embodiment, this time interval is, by default, 20 weeks. Then, to find the best day during the week, auction optimization system 40 applies the following computation:

$$\forall s, s \in [\text{Sun, Mon}, \ldots, \text{Sat}] \text{ for days of the week}$$

$$\rightarrow \text{MAX} \sum_{i=0}^{\Omega} \frac{\tau_s}{i+1}$$

Where $T_s$—Total no. of auctions during day 's'
 i—Amount of time away from present time that $\overline{P}$ was calculated for day 's'. This will be a whole number of weeks. And, at 'present' time, i=0.

Best Time Window During The Month

Let $\Omega$ represent the adjustable time interval for this analysis. In one embodiment, this interval, by default, is 13 months. Then, to find the best month during the year, auction optimization system 40 applies the following computation:

$$\forall s, s \in [\text{Jan, Feb}, \ldots, \text{Dec}] \text{ for months of the year}$$

$$\rightarrow \text{MAX} \sum_{i=0}^{\Omega} \frac{\tau_s}{i+1}$$

Where $T_s$—Total no. of auctions during month 's'
 i—Amount of time away from present time that $\overline{P}$ was calculated for month 's'. This will be a whole number of months. And, at 'present' time, i=0.

As the above indicates, auction optimization system 40, in one embodiment, weights the results such that the more recent values are more significant. For example, assume for didactic purposes that the length of each time interval, $\Omega_i$, is 6 hours and that the user has selected an overall analysis window of 60 days into the past. Auction optimization system 40 then starting with the current day determines for a given time interval, $\Omega_i$, the number of auction started on that day, $T_s$ and divides this by 1 (1+0). In the didactic example, auction optimization system 40 for the time interval between noon and 6 pm computes the number of auctions started on the current day (e.g., 3) and divides this value by 1. Auction optimization system 40 then repeats this for the next day in the past for the same time interval. Assuming that another three auctions occurred that day within that same time interval, the resulting value would be 3 auctions divided by 2[1+ the time (in days) between the current time and the day the auctions started]. Auction optimization system 40 then repeats this process for all days in the analysis window summing the results, and repeats the entire process for all other time intervals. FIG. 12 illustrates a plot resulting from the computation set forth above. In addition, this process can be repeated for best time of day, day of the week, week of the month, month of the year, season, quarter, etc. From this plot or computation, a user or auction optimization system 40 may select an optimal time to start the auction.

In another embodiment, the computation of the best start time window is computed with respect to the weighted final auction prices, as computed above. In one embodiment, auction optimization system uses the method of calculating the best time window by using a weighted price calculation operation. For each time interval in the analysis window, auction optimization system computes the $\overline{P}_k$ value by following the previous formulas, i.e., $$\overline{P}_k = \frac{\sum_i P_i \cdot \overline{W}_i}{\sum_i \overline{W}_i}$$

to calculate the mean price during that time interval. As above, the following computations include factors such that closer auctions to the present time are more significant to the calculation, while auctions more distant in time are less significant. In one embodiment, auction optimization system applies the following computations for best time of day, day of the week and month of the year.

Best Time Window During The Day

Let $\Omega$ represent the adjustable time interval for this analysis, such as 60 days. Then, to find the best time window during the day, auction optimization system 40 computes:

$$\forall k, k \in \left[1, 2, \ldots, \frac{24}{E}\right]; E = \# \text{ of hours per time window}$$

$$\rightarrow \text{MAX} \sum_{i=0}^{\Omega} \frac{\overline{P}_k}{i+1}$$

Where $\overline{P}_k$—Mean price during time window 'k' i—Amount of time away from present time that $\overline{P}$ was calculated for time window 'k'. This will be a whole number of days. And, at 'present' time, this value=0.

Best Time Window During The Week

Let $\Omega$ represent the adjustable time interval for this analysis, such as 20 weeks. Then, to find the best day during the week, auction optimization system 40 computes:

$$\forall k, k \in [\text{Sun, Mon}, \ldots, \text{Sat}] \text{ for days of the week}$$

$$\rightarrow \text{MAX} \sum_{i=0}^{\Omega} \frac{\overline{P}_k}{i+1}$$

Where $\overline{P}_k$—Mean price during day 'k' i—Amount of time away from present time that $\overline{P}$ was calculated for day 'k'. This will be a whole number of weeks. And, at 'present' time, this value=0.

Best Time Window During The Month

Let $\Omega$ represent the adjustable time interval for this analysis, such as 13 months. Then, to find the best month during the year, auction optimization system 40 computes:

$$\forall k, k \in [\text{Jan, Feb}, \ldots, \text{Dec}] \text{ for months of the year}$$

$$\rightarrow \text{MAX} \sum_{i=0}^{\Omega} \frac{\overline{P}_k}{i+1}$$

Where $\overline{P}_k$—Mean price during month 'k' i—Amount of time away from present time that $\overline{P}$ was calculated for month 'k'. This will be a whole number of months. And, at 'present' time, this value=0.

A.5. Suggested Duration for Auction

In one embodiment, auction optimization system 40 computes a suggested duration for the contemplated auction. To determine the optimal length for an auction, auction optimization system 40 operates on the empirically-based assumption that roughly 40% of the duration (T) of a typical auction is idle time (I). The objective in computing a suggested duration is to minimize this idle time, while ensuring that the auction is active long enough to achieve the highest possible price.

Given n comparable prior auctions under analysis, with idle times $I_i$ and durations $T_i$, an optimal duration $T_{opt}$ can be computed according to the following:

$$T_{opt} = \frac{\sum_{1}^{n} T_i \cdot \left(2 - \frac{I_i + \Phi T_i}{T_i}\right)}{n}$$

where, $T_i$—Duration of auction i $I_i$—Idle time of auction i; $0 \leq I_i \leq T_i$ n—Number of auctions $\Phi$—Proportion of time auction is typically active (non-idle), usually 0.6.; $0 < \Phi < 1$ On the basis that roughly 40% of the duration of a typical auction is idle, note that the portion of the equation, $$\left(2 - \frac{I_i + \Phi T_i}{T_i}\right)$$

will range from 0.4 to 1.4. This is normalized around 1.0, which then makes it a suitable weighting multiplier. The constant $\Phi$ is determined by analyzing historical data to determine the non-idle time for typical auctions. It may be adjusted over time if the behavior of the auctions observed by auction optimization system 40 changes.

For some auction systems, it may be necessary to round the optimal auction time to a value that can validly be selected during initialization of an auction with an online auction site. For example, in one embodiment of the invention, auctions may only be configured in lengths of 3, 5, 7, or 10 days. The optimal auction length $T_{opt}$ may be mapped to a suggested auction length $T_s$ using a table, generated so that the suggested times are not more than 25% away from the difference between the suggested auction lengths. Here, $T_{opt}$ will never be less than 3 days or more than 10 days.

| $T_{opt}$ | $T_s$ |
|---|---|
| 3-3.5 days | 3 days |
| >3.5-5.5 days | 5 days |
| >5.5-7.75 days | 7 days |
| >7.75-10 days | 10 days |

A.6. Suggested "Buy-It-Now" Price

Auction optimization system 40, in one embodiment, is also operative to compute a suggested "buy-it-now" price. Assuming the seller has configured the auction to include it, a "buy-it-now" price is an option a bidder may select to essentially close the auction early and purchase the item at the price provided by the seller. One skilled in the art will be able to configure auction optimization system 40 to recognize auctions that ended with the "buy-it-now" option when analyzing the auction data gathered as discussed more fully below. For example, the bid histories associated with completed Buy-It-Now auctions are usually tagged with 'Item has ended' or with 'Auction has ended with Buy It Now' and with at least 1 bid. These tags may change accordingly depending on the conventions used by the on-line auction facility, but generally there will be some attribute of the bid history for identifying completed auctions that ended with use of the Buy-It-Now option.

In one embodiment, auction optimization system 40 computes a suggested "buy-it-now" price based on auctions that have ended due to a bidder selecting the "buy-it-now" option. Using most of the historical data collected on auctioned items, and data on auctions presently held for the item (or items similar to that item), an optimal price for setting a Buy-It-Now price can be derived. An aspect of this computation, according to an embodiment of the present invention, is based on the fact that further away in time an auction is from present time, the less 'important' it is to the weighting factor in deriving the suggested "buy-it-now" price. In one embodiment, the weighting decreases exponentially over time. In one embodiment, any auctions completed more than 60 days from the present time are not considered in the analysis; however, any suitable cut-off period can be used. We shall also not consider any completed auction past 60 days, since they are probably no longer relevant. In one embodiment, auction optimization system 40 computes a suggested "buy-it-now" price, $B_{opt}$, according to the following process:

Let $B_i$ represent the Buy-It-Now auction during the period of up to 60 days from the present time, plus the auctions presently held for that particular, or similar, item.

And, let ρ represent the amount of completed time of past auction history to consider. In one embodiment this value is 60 days.

Then, $$B_{opt} = \frac{\sum_i^n B_i \cdot \left( \frac{Z \cdot (\rho - \Psi_i)^2 + Z}{\rho^2} \right)}{n}$$

where $B_i$—Buy-It-Now price for auction i during stated interval.

$\Psi_i$—Amount of time away from present time that auction i completed. This will be a whole number of days. And, at 'present' time, this value=0. So, $0 \leq \Psi_i \leq \rho$ Z—Normalization weighting constant for this Buy-It-Now pricing. This will range the weighting portion from Z to 2Z. Typically, Z=0.55.

ρ—Amount of time of completed auctions to consider. Typically, ρ=60.

A.7. Suggested Reserve Price

Figure 13A:
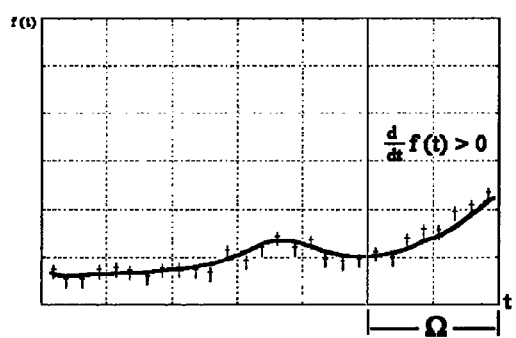
FIGS. 13A and 13B are graphs illustrating the upward and downward trends, respectively, for weighted average final auction price for a given item.
Figure 13B:
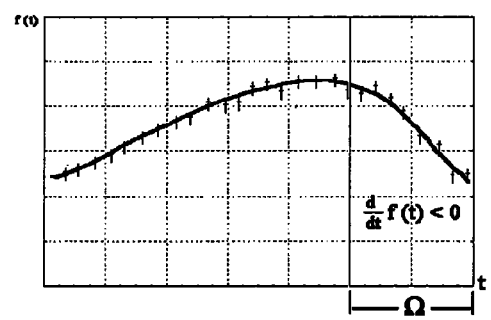

Auction optimization system 40, in one embodiment, may also compute a suggested reserve price. In general, there are two basic situations from which to draw a conclusion about setting a Reserve Price. In one situation, the general trend of the price of the item, as determined above in Section A.2., slopes up; in the other situation, the general trend slopes down. FIGS. 13A (upward trend) and 13B (downward trend) illustrate these two situations. The reason for these trends are that there is either higher demand or lesser demand for such an item. Hence, using this information, one can derive the following rules for setting a Reserve Price:

1) First, auction optimization system 40 computes an approximation to the slope of the price-versus-time curve, in one embodiment, by using well-known spline formulas to indicate the curve or slope during an adjustable time period Ω (in one embodiment, this time period is set to 30 days). Therefore, a) If $$\frac{d}{dt} f(t) > 0,$$

then there is no need to set a Reserve Price, since the general trend of the item price is rising and setting a Reserve may deter bidders.

B.) If $$\frac{d}{dt} f(t) \leq 0,$$

then auction optimization system 40 suggests setting a reserve price, $R_{opt}$, according to the following formula:

$$R_{opt} = \frac{\sum_i P_i \cdot \overline{W}_i}{\sum_i \overline{W}_i}$$

for all auctions i in the time period Ω, and $P_i$ and $\overline{W}_i$ are price and mean weight calculated as described above for each auction i in time period Ω.

A.8. Auction Splitting or Consolidation

In one embodiment, assuming the user has more than one identical or similar item to sell, auction optimization system 40 computes whether it is best to consolidate the items into a single auction or to split them into multiple postings. In one embodiment, auction optimization system 40 considers two main factors in computing such a suggestion:

$$\frac{d}{dt} f(t)$$

A.) The general slope of the puce graph during a given time interval Ω, as described above; and B.) The change in daily average number of auctions posted at the present time, ΔDV,
from the daily average number of auctions posted during the interval Ω.

Auction optimization system 40 computes a suggestion based, in one embodiment on the decisional matrix below:

| $\frac{d}{dt} f(t)$ | ΔDV | |
|---|---|---|
| >0 | >0 | Consolidate into dutch auction |
| >0 | <0 | Split into multiple auctions |
| <0 | >0 | Split into multiple auctions |
| <0 | <0 | Consolidate into dutch auction | where $$\frac{d}{dt} f(t)$$

is the general slope of the price graph during a given time interval Ω as defined previously and ΔDV is the change in daily average number of auctions posted (daily volume).

B. Exemplary Operating Environment and Operation

B.1. Network Environment

FIG. 1 sets forth a computer network environment in which an embodiment of auction optimization system 40 operates. As FIG. 1 shows, in one embodiment, the computer network environment includes auction optimization system 40, at least one on-line auction facility 30, and at least one client computer 60. On-line auction facility 30 is a network-based auction facility, in one embodiment, comprising one or more of a number of types of front-end servers 31, application server 32, search server 34, and database server 36. Front-end servers 31, namely web servers 31 are operative to establish HTTP or other connections with client computers 60 and deliver web pages (e.g., markup language documents) in response to HTTP requests. Application servers 32 host auction-based functionality allowing users to, for example, establish accounts, post auctions and place bids in auctions. Search servers 34 handle search requests, allowing users to locate auctions for items of interest by specifying keywords or other search terms. Search servers 34 also allow users to view bid history data for past, completed auctions, as well. Database server 36 maintains user account data, as well as auction data for current and completed auctions. U.S. Pat. No. 6,466,917, which is incorporated by reference herein, discloses an auction facility suitable for use in connection with the present invention.

Users access on-line auction facility 30 with a client program, such as a browser (e.g., the Internet Explorer distributed by Microsoft Corp. of Redmond, Wash. that executes on a client machine 60 and accesses the facility 30 via a network such as, for example, the Internet 50). Other examples of networks that a client computer 60 may utilize to access the auction facility 10 include a wide area network (WAN), a local area network (LAN), a wireless network (e.g., a cellular network), or the Plain Old Telephone Service (POTS) network.

As FIG. 1 illustrates, auction optimization system 40, in one embodiment, comprises authentication server 42, auction optimization application servers 44a, 44b, 44c, and data warehouse 46. In one embodiment, the functionality of auction optimization system 40 is hosted by a data center with highly redundant Internet connectivity. As FIG. 1 shows, the local network that interconnects the components of the auction optimization system 40 is connected to the Internet 50 with router 22.

In one embodiment of auction optimization system 40, the functional software components are divided up between machines or computing devices that are categorized three different ways (referred to here as "nodes"). In one embodiment, all of the machines generally have the same or similar configuration; in one embodiment, the machines are commodity PC-style server hardware, running the Linux operating system. In one embodiment, the web server technology employed is the Tomcat server provided by the Apache Jakarta project, and database used is the PostgreSQL database. The data warehouse 46 may be implemented on a larger-scale commercial database, such as Oracle, if scaling requires it.

Authentication server 42 is operative to authenticate users to allow access to auction optimization system 40. Authentication server 42, in one embodiment, has a local database and web server. It services the initial incoming HTTP requests from users before they have logged in, authenticates the user with a username and password, and redirects the user to one of the application server nodes (e.g., 44a, 44b, 44c, etc.), where the primary work is done. Users are either distributed to a fixed node every time they log in, or are alternatively distributed using some load-balancing mechanism such as round-robin. The load on the authentication server 42 is limited because it only handles the initial requests from unauthenticated users, and therefore needs to only be able to scale to handle the number of new user logins that are occurring in the system at any given time.

The application server nodes 44a-c, in one embodiment, each also have local databases and web servers. These nodes, in one embodiment, perform the bulk of the auction optimization application activities (see below). Since users are expected to interact with the auction optimization application frequently, scalability is accomplished by adding additional identical application server nodes to the configuration, as required. The database on each application server node contains the private data of users, and local data that is kept in the operation of the application. Because this data is accessed very frequently, it is kept in a local database on the same node as the web server, to avoid round-trip time on the network accessing a remote database.

Figure 23:
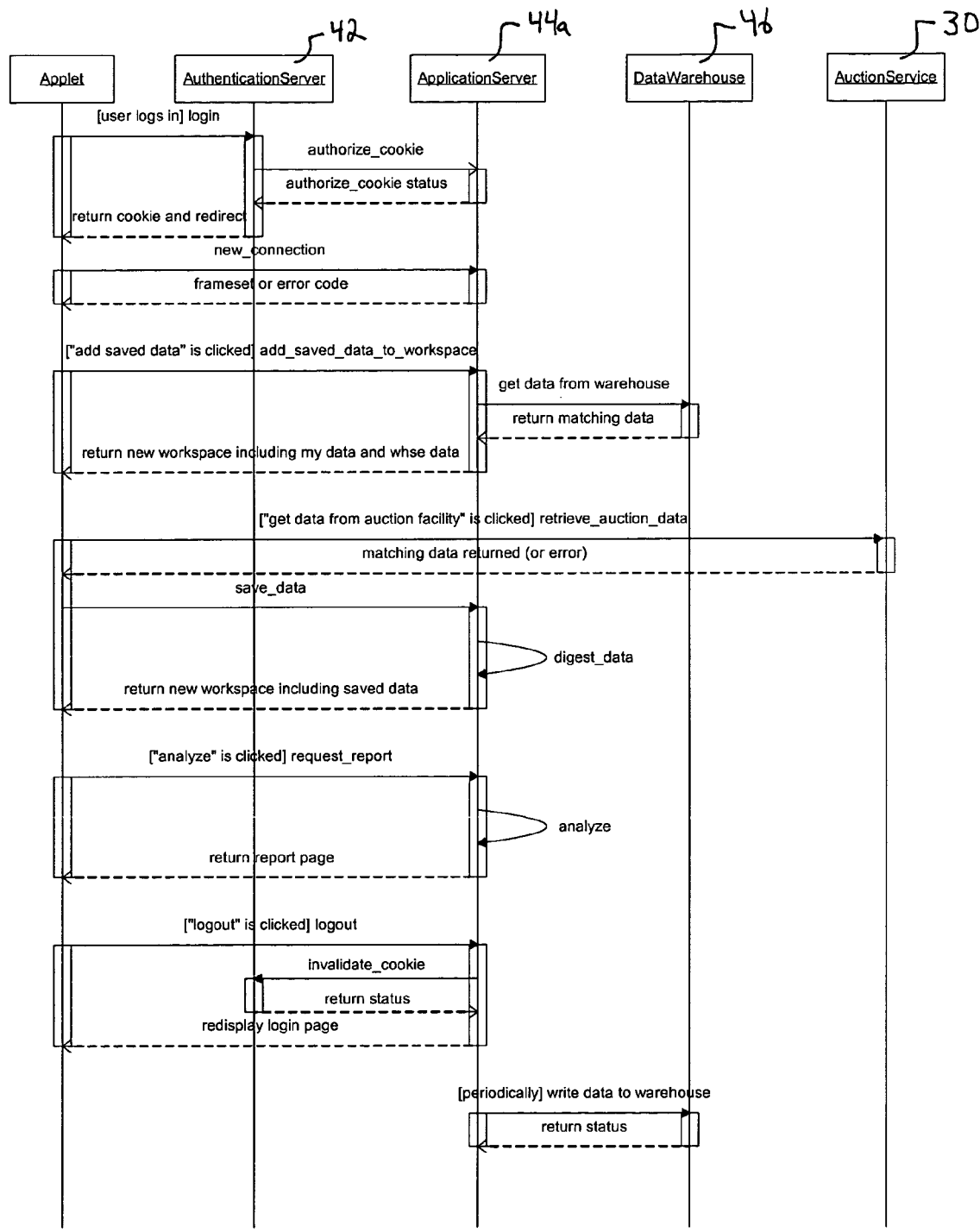
FIG. 23 is a sequence diagram showing operation of auction optimization system according to an embodiment of the present invention.

FIG. 22 provides a breakdown of certain functional components of an auction optimization application server 44a-c, according to an embodiment of the present invention. As FIG. 1 illustrates, auction optimization application servers 44a-c operate in connection with other separate components, such as at least one authentication server 42 and a data warehouse 46. In other embodiments, however, the functionality of one or both of the authentication server 42 and the data warehouse may be integrated into the same physical device that hosts the functionality of auction optimization application servers 44a-c. In addition, FIG. 23 provides a sequence diagram illustrating the sequence of operations during a given session, according to an embodiment of the present invention.

As FIG. 22 illustrates, auction optimization application server 44a-c, in one embodiment, includes authentication and session launching module 202, data digester 204, data analysis module 206, data summarizing and archiving module 208, and report formatting and generation module 210, and user database 212. Authentication and session launching module 202 creates sessions for new users, under control of the authentication server 42. The authentication and session launching module 202, in one embodiment, receives calls from the authentication server 42 indicating who is allowed to log in, and then allows sessions to be established for users who have been so identified. FIG. 23 illustrates this flow in the top of the sequence diagram. Note that, in one embodiment, when a user connects to the authentication server 42 to get access to the system, the authentication server 42 makes a call back to the authentication and session launching module 202 residing on the auction optimization application server 44a to let it know that this user is allowed in. As FIG. 22 demonstrates, each user session 220 maintained in a memory contains a workspace 222, which in one embodiment, is a group of past and current auctions being considered for analysis. Authentication and session launching module 202 also receives new connection requests, and displays the application's basic frame set on the user's web browser (with the top frame, tabs, and the lower frame which contains either application data or data from auction facility 30.) Session launching module 202 also handles logout requests, tears down sessions and notifies the authentication server 42 that the user session has ended.

Data digester 204 handles requests for queries of the data warehouse 46, and adds the data retrieved from the data warehouse to the current workspace 222. Data digester 204 also receives data from client computer 60 gathered by the applet residing thereon, and adds it to the workspace 222. In one embodiment, data digester 204 digests web pages, received by the applet executing on client computer 60 and transmitted to auction optimization application server 44a, into a form (with the HTML stripped out) that can be used by data analysis module 206, and/or inserted into the data warehouse 46, or into the application server's local database, for later transfer to the data warehouse 46. Data summarizing and archiving module 208, in one embodiment, calculates statistics and summary data from the auction data, and inserts the statistical and summary data into the data warehouse 46. Data summarizing and archiving module 208 also periodically transfers new data to the data warehouse 46 where it becomes available to other users.

Data analysis module 206 performs auction optimization analysis, described above, on the selected data in the workspace 222. As discussed above, in one embodiment, the user at client computer 60 within the context of the Auction Optimizer applet searches for relevant auction data maintained by on-line auction facility 30 and Page: 25
adds and removes auctions from the workspace 222 until the workspace 222 contains the desired set of auctions to be analyzed. To trigger the analysis, the user invokes the analysis function, causing the data analysis module 206 to operate on the auctions in the workspace 222. Report formatting and generation module 210 formats the analyzed data and suggestions and generates a report for the user.

The data warehouse 46 is a database contains longer-lived data, such as statistics, the results of earlier calculations of the Auction optimization formulas described above, and data that is archived off and shared between multiple users. This database is typically accessed only once per forecasting calculation, and for the upload of new data.

B.2. Overall Process Flow

Figure 14:
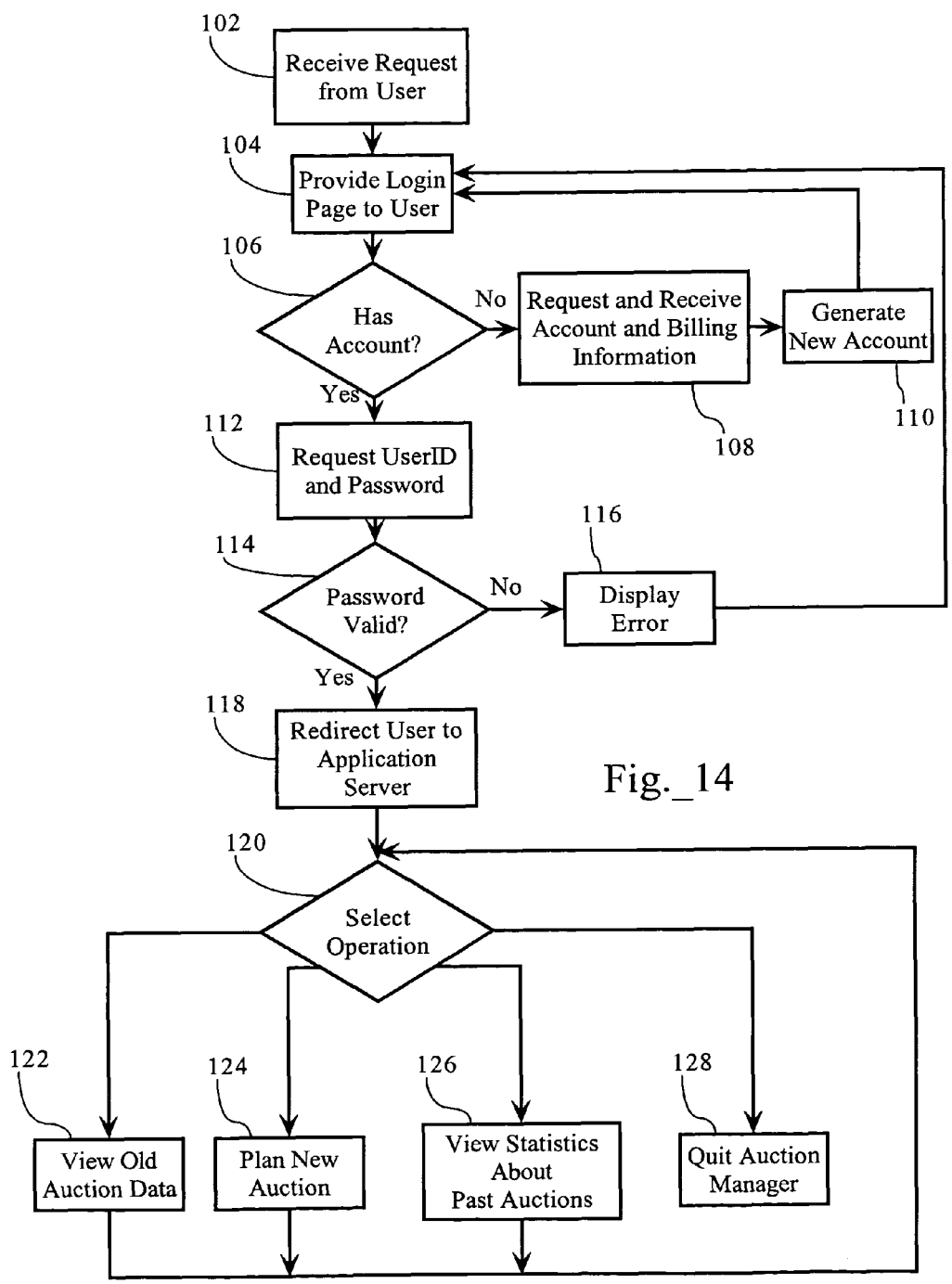
FIG. 14 is a flow chart diagram illustrating the overall process flow, according to an embodiment of the present invention, associated with auction optimization system.

FIG. 14 illustrates the overall process flow associated with an embodiment of auction optimization system 40. In one embodiment, when auction optimization system 40 receives an initial login request from the user (102), the user is redirected to authentication server 42 which provides a login page to the user (104). The login page queries the user for his or her user name and password, or invites the user to create a new account. If the user does not have an account, the user is prompted for account and billing information (108), such as a user name, password, billing address and credit card account information. Authentication server 42 generates a new account (110) and provides the login page to the user (104). If the user has an account, authentication server 42 queries the user for a user name and password (112). If the password is valid, authentication server 42 redirects the user to one of the application servers 44a-c (118). Otherwise, an error message is transmitted to the user (116), and the user is prompted to provide a user name and password again.

Once the user has been successfully authenticated, authentication server redirects the user to the application server 44a-c, which, in one embodiment, offers one of four major operations:

1) View old auction data (122): From this screen, the user may review data about auctions that they have been previously saved away. This option provides the user with longer-term storage for information about old auctions. Auction web sites typically expire information about old auctions after a relatively short period of time, after which it is no longer accessible.

2) Plan a new auction (124): This is the bulk of the functionality of the auction optimization system 40, the operation of which is described in more detail herein.

3) View statistics about old auctions (126): From this screen, the user may review the following information about their own previous auctions that they have carried out after consulting the Auction optimization tool: a) Values recommended by the Auction optimization tool for price, duration, buy-it-now price, reserve, etc.; b) Values actually entered by the user in the auction; and c) Final results of the auction.

4) Quit the application (128): By selecting this option, the user logs out of the system.

B.3. Planning New Auction Process Flow

Figure 15:
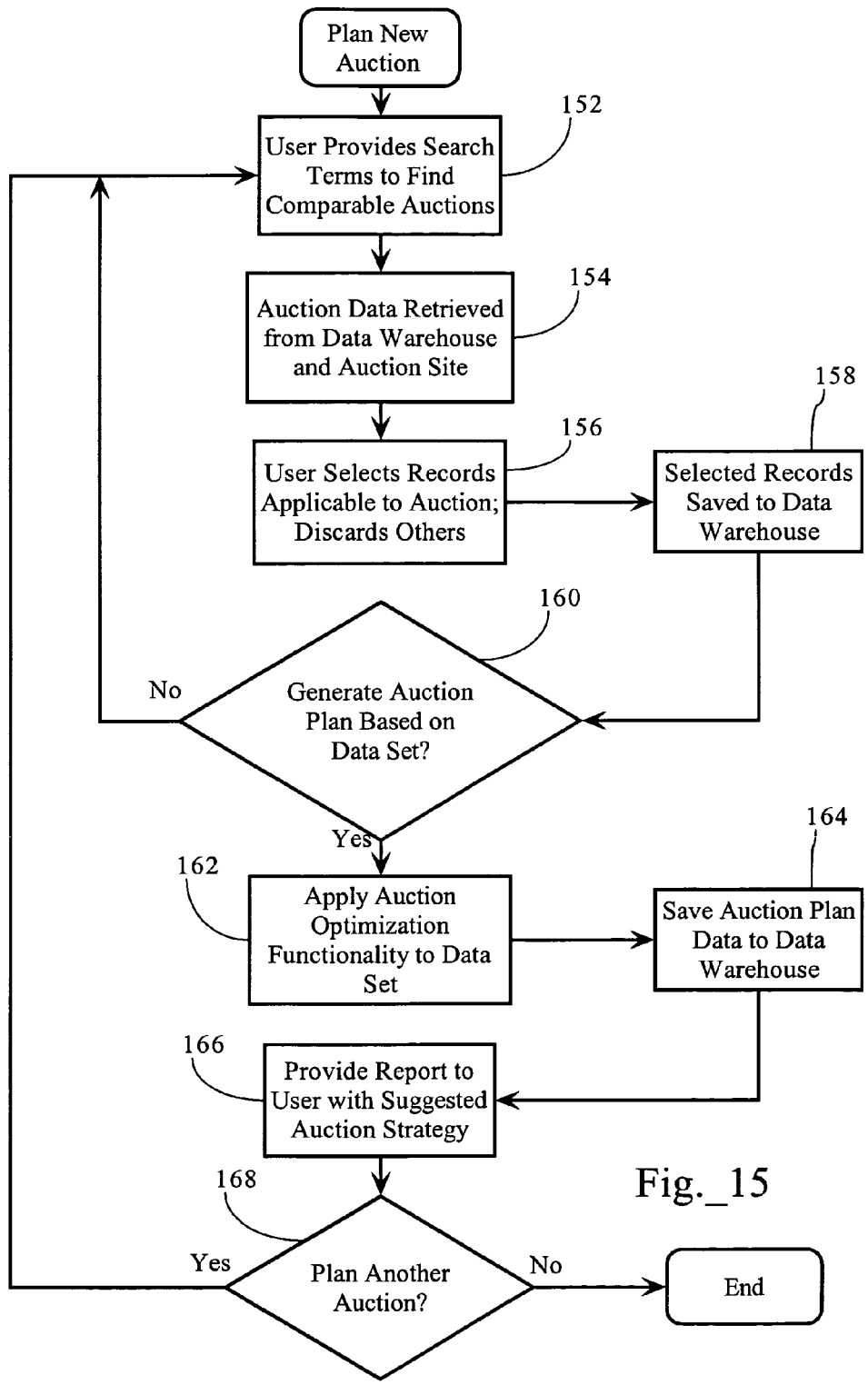
FIG. 15 is a flow chart diagram showing the overall process flow, according to an embodiment of the present invention, associated with planning a new auction.

FIG. 15 illustrates the overall process flow associated with planning a new auction using auction optimization system 40. In one embodiment, most of the processing occurs on one of the application server 44a-c; however, some processing occurs on the data warehouse 46, such as saving auction data and the data generated when an auction is planned.

As FIG. 15 shows, the user first provides search terms, such as keywords, to find auction data for completed and currently pending auctions for items that are the same as, and/or comparable to, the item the user plans to auction (152). On-line auction facility 30 maintains a plurality of pending auctions and also stores past completed auctions going back a given period of time. As discussed more fully below, this past and present auction data is gathered and provided to auction optimization system 40 using one to a plurality of data gathering methods described below. In one embodiment, after the user has specified search terms, auction optimization system 40 retrieves auction data matching the search terms from data warehouse 46 and on-line auction facility 30 (154).

Auction optimization system 40, in one embodiment, displays a list of the retrieved auction records to the user and allows the user to select or de-select any auctions that are not applicable to the item(s) the user desires to sell (156). The user, in one embodiment, clicks on a "selection complete" button causing the user's browser to transmit the selected auctions to auction optimization system 40. In one embodiment, the auction data corresponding to the selected auctions is saved to data warehouse 46 (158) and is available during subsequent searches to other users. As FIG. 15 illustrates, the user is then provided the option of generating an auction plan based on the present data set (160), or to re-specify search terms to find more or alternative auctions.

If the user wishes to generate an auction plan based on the retrieved data set, auction optimization system 40 applies the auction optimization functionality described herein to generate an auction plan based on the data set (162), and saves the auction plan data to the data warehouse 46 (164). Auction optimization system 40 then provides a report including the auction plan to the user (166). The report, in one embodiment, includes a predicted final auction price, a suggested starting price, as well as other suggested auction parameters as described more fully in other sections. As FIG. 15 provides, the user may then opt to generate another auction plan, or exit the auction planning aspect of the system and return to the main menu (168). With the report, according to one embodiment, the user accesses on-line auction facility 30 directly and posts an auction using the suggested auction parameters as the user desires. In another implementation, the downloaded page including the report contains Javascript or a Java applet that allows the user to click on a button and have the auction automatically posted to on-line auction facility 30. In such an embodiment, the user account information stored with each user includes the user name and password corresponding to the user's account with on-line auction facility 30.

B.4. Auction Data Acquisition

A variety of technologies and methodologies can be employed to gather auction data from one to a plurality of on-line auction facilities 30. In one embodiment, auction optimization system 40 can receive auction data directly from on or more on-line auction facilities 30 on a periodic basis. For example and in one embodiment, on-line auction facility 30, pursuant to an arrangement with auction optimization system 40, transmits bid history and other data associated with completed auctions during a nightly batch process for example. In such as embodiment, auction optimization system 40 stores the auction data in data warehouse 46 for use by users in searching for and selecting suitable auction data for analysis and development of an auction plan.

In another embodiment, auction optimization system 40 can employ a crawler, spider or bot to gather auction information and store it in data warehouse 46. In such an embodiment, the crawler can search for completed auctions for items commonly sold on on-line auction facility 30, such as cars, motorcycles, electronics, collectibles, and the like. In one embodiment, this crawler can execute on a regular, periodic basis and adhering to the rules specified in the Standard for Robot Exclusion (SRE). In another embodiment, the crawler can operate to crawl a plurality of on-line auction facilities to gather completed and pending auction data on-demand in response to a user request. For example, a user may specify search terms or select from one or more pull-down menus to specify an item to be auctioned. The crawler may then operate to return completed and pending auction data based on the search terms or specified item. In addition, as discussed above, the data warehouse 46, in one embodiment, is also searched with the same keywords or specified item. The data warehouse 46 may contain auction information that is substantially older than the information that is available from the auction web site.

In an alternative implementation, the user, at client computer 60, may query the on-line auction facility 30 directly, and transfer the auction data retrieved to auction optimization system 40, for example by saving the data to a file and transferring the data, or by using a Javascript utility which reads information from the frame in the web browser containing the data, and writing it into the frame containing the user interface associated with auction optimization system 40, as described more fully below.

In one embodiment, auction optimization system 40 acquires auction data for subsequent analysis in a manner that satisfies the following two requirements:

1) The data must be downloaded on the user's direct request—auction optimization system 40 does not automatically crawl on-line auction facility from the application server 44*a-c*. This ensures that excessive requests will not be generated to on-line auction facility 30 and that the data maintained by on-line auction facility is being used in accordance with the intent of most data use policies—i.e., to provide it directly to their subscribers for their own use.

2) The download of the necessary data for analysis is accomplished in a way that integrates well with the user's normal experience of using the on-line auction facility 30. In one embodiment, users are not be required to run a separate application, or manipulate multiple browser windows, to gather auction data.

In one embodiment, auction optimization system 40 utilizes client-side functionality on client computer 60 to gather auction data in a manner consistent with normal use of on-line auction facility 30. In one embodiment, when the user accesses auction optimization system 40 and clicks on a link to plan a new auction, auction optimization system 40 provides a multi-frame page to the user that allows the user to search on-line auction facility 30 for applicable auctions and facilitates capture of the bid histories associated with the auctions.

Figure 16:
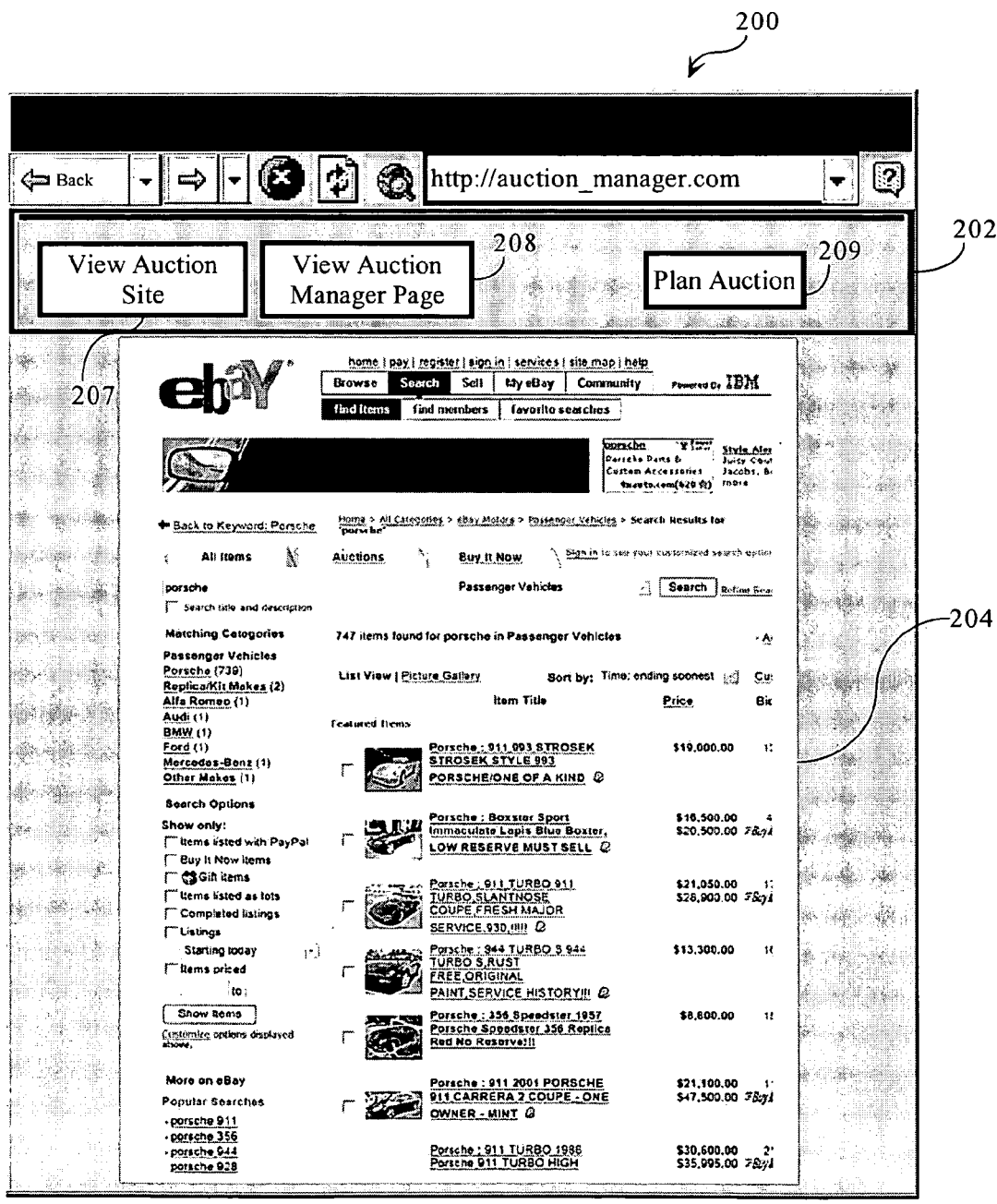
FIG. 16 illustrates a user interface according to an embodiment of the present invention.

FIG. 16 illustrates a web page 200, according to an embodiment of the present invention, transmitted by auction optimization system 40 in response to a request to plan a new auction. As FIG. 16 shows, web page 200 includes two frames—one small "Auction optimization" frame 202, on the top, contains the Auction optimization controls. Another large frame 204, on the bottom, allows the user to access an on-line auction facility, such as eBay.com, as the normally would. The contents of the bottom frame can be controlled with tabs or buttons that select either the normal auction facility display (207), or the Auction optimization results (208). In one embodiment, the Auction optimization frame 202 contains a Java applet or similar downloadable module. In another embodiment, the functionality of the Java applet can be incorporated into a browser plug-in.

According to an embodiment of the invention, a user searches on-line auction facility 30 for past completed auctions relevant to the planned auction, by entering keywords and other search terms in a conventional manner. Typically, auction facility 30 provides the search results to the user in the form of a list with hypertext links to pages with information about each auction, such as additional details of the item and the bid history. The Java applet, in one embodiment, is operative to parse the HTML pages displayed in frame 204 to create a list mirroring the list provided by on-line auction facility 30. The buttons 207, 208 allow the user to toggle between the list provided by on-line auction facility 30 and the list maintained by the Java applet. The interface provided by the Java applet, however, allows the user to exclude selected auctions from the search results from further analysis. When the user presses the "Plan Auction" button (209), the Java applet, using information the user has provided about what they are searching for in the auction facility screen, the list of auctions transmitted in the page provided by on-line auction facility 30, accesses on-line auction facility 30 to request the bid histories and other detail information for each auction in the list selected by the user. Data downloaded from on-line auction facility 30 is then forwarded, through the Java applet operating inside the browser's top frame, to the application server 44*a-c* for analysis as described herein. In one embodiment, the downloaded data is provided to the workspace 222 of the user session 220 created for the user. When the application server 44*a-c* completes the analysis, it sends back a page containing the results of the analysis, which will be accessible on the bottom frame, and may be selected with the buttons 207, 208.

C. Exemplary Operation

The following provides a didactic example to illustrate the operation of auction optimization system 40, according to an embodiment of the present invention. Assume, for didactic purposes, that a user wishes to place an auction post for a new pair of Diesel Kratt® jeans. The user accesses auction optimization system 40 to learn the price for which his jeans may sell at auction.

To initiate the planning of the auction, auction optimization system 40 provides a page, as described above, including the search page of on-line auction facility 30. As described herein, the user obtains a list of completed auctions using the keywords 'Diesel Kraft' and perhaps appended with other key words more specific to his particular jeans, such as men's jeans. In one embodiment, auction optimization system 40 may augment the list retrieved from on-line auction facility 30 with relevant search results from data warehouse 46. Another list of pending auctions would also be retrieved using the same keyword search. When the user is satisfied with the results of the search, he invokes the functionality of the Java applet to retrieve the relevant bid histories associated with the list of completed auctions.

FIG. 17 provides an example of what the final auction price data may resemble for completed auctions for the item 'diesel kratt' jeans over a 6 week window. In addition, the bid history for one particular completed auction may resemble the data in FIG. 18. Once all requisite data has been gathered, auction optimization system 40 computes the factor weightings for each completed auction in the analysis interval (here, six weeks) as follows. For didactic purposes, computations of the factor weightings given the bid history data of FIG. 18 is set forth below.

1.) Total Number of Bids. For Weight 1, the total number of bids placed during the entire course of this auction is 25. In this didactic example, the average number of bids for each completed auction in the data set is 10. $W_1$ can calculated by:

$$W_1 = k + N_1 \cdot (b - b_{avg} - \lambda \cdot (Q-1)) \text{ or } W_1 = 1 + 0.05 \cdot (25 - 10 - \lambda \cdot (1-1))$$

Accordingly, $W_1 = 1.75$ for this example, if $k=1$ and $N_1 = 0.05$ as a constant. Constant $\lambda$ does not apply here, since this is not a Buy-It-Now auction with multiple items.

2.) Number of Bids in Last 12 Hours. The number of bids in the last 12 hours can be calculated based on the Ending time of the auction and subtracting 12 hours to provide the 12-hour time window. Using the above example, there are 5 bids within the last 12 hours of remaining time; and on average across all auctions in the data set, there were 4.3 bids. Therefore, $$W_2 = k + N_2 \cdot (l - l_{avg}) \text{ or } W_2 = 1 + 0.25 \cdot (5 - 4.3)$$

Accordingly, $W_2 = 1.175$ for this example, if constant $k=1$ and $N_2 = 0.25$.

3.) Change in Price. In the didactic example of FIG. 18, the weighting factor, W3, would be equal to k, since no bid has a change in price that crosses over the threshold. FIG. 19 illustrates a bid history where at least one bid crosses the change in price threshold.

Consider the following bid history data:

Final price for this auction was $845.00. So, $P_f = \$845.00$

| Name | Bid | Price Diff. | % of Final | Date of Bid |
| --- | --- | --- | --- | --- |
| Bidder 1 | 845.00 | | | May-20-03 02:01:31 PDT |
| Bidder 7 | 835.00 | Δ = 10 | 1.18 | May-20-03 04:20:12 PDT |
| Bidder 6 | 350.00 | Δ = 485 | 57.40 | May-20-03 03:58:30 PDT |
| Bidder 5 | 80.00 | Δ = 270 | 31.95 | May-19-03 18:48:49 PDT |
| Bidder 4 | 50.00 | Δ = 30 | 3.55 | May-19-03 15:57:43 PDT |
| Bidder 3 | 50.00 | Δ = 0 | 0.00 | May-19-03 17:20:32 PDT |
| Bidder 2 | 20.00 | Δ = 30 | 3.55 | May-19-03 17:20:07 PDT |

Using the above example table from actual data, and assuming a threshold value for δ of 25, the only 2 values surpass this threshold value are by Bidders 5 and 6. Therefore, $W_3 = k + N_3 \cdot ((57.40 - 25) + (31.95 - 25)) = k + N_3 \cdot (32.40 + 6.95)$ or in this case $$W_3 = 1 + \frac{1}{100}(39.35) = 1.3935,$$

if the constant values k=1 and $$N_3 = \frac{1}{100}$$

as me weighting constants for this constraint.

4.) Time Value of Higher Bids. Again, using the example provided by FIG. 19, assume a final price $P_f$ of 405 and let $$N_4 = \frac{1}{700}$$

for the weighting formula. Given the bid history of FIG. 19, there are bids that factor into the computation of this weighting factor. Thus, $$W_4 = k + N_4 \cdot \sum \left(100 \cdot \frac{D_i}{P_f}\right) \cdot (T_A - t_i) \text{ or } W_4 = 1 + \frac{1}{700}((27.16)(0.0017) + (96.27)(6.82))$$

So, for this example, the weighting factor, $W_4$, is equal to 1.938011. The normalization constant, $N_4$, can be varied as necessary, but in this case example, $$N_4 = \frac{1}{700}$$

provides a sufficient result.

5.) Beginning of auction Idle Time.
Suppose the following example bid history data:

| | | | |
| --- | --- | --- | --- |
| Currently | $2306.99 | | First bid $1200.00 |
| Quantity | 1 | | #of bids 6 |
| Time left | Auction has ended. | | |
| Started | May-07-03 18:31:26 PDT | | |
| Ends | May-14-03 18:31:26 PDT | | |
| Seller (Rating) | xxx | | |

| Bidder 1 | 1200.00 | May-13-03 12:32:29 PDT |
| --- | --- | --- |
| Bidder 2 | 1500.00 | May-13-03 12:32:54 PDT |
| Bidder 1 | 1444.00 | May-14-03 06:16:59 PDT |
| Bidder 4 | 1555.00 | May-14-03 06:17:05 PDT |
| Bidder 5 | 2281.99 | May-14-03 18:31:24 PDT |
| Bidder 6 | 2306.99 | May-14-03 18:31:26 PDT |

In this example, the bid history data is sorted in ascending chronological order as bids are placed. The idle time from the start of the auction to the time the first bid was placed by Bidder1 is approximately 5.75 days. In this case, $I_B = 5.75$. Note that the time duration of the auction $T_A$ is 7 days total. Using these values in the weighting formula for constraint no. 5, yields:

$$W_5 = k - N_5 \cdot (5.75 - 0.14 \cdot 7) = k - N_5 \cdot (5.75 - 1.0)$$

or, $$W_5 = 1 - \frac{1}{14} \cdot (4.75) = 0.66071,$$

if the constant values k=1 and $$N_3 = \frac{1}{14}$$

as the weighting constants for this constraint.
6.) Middle and/or Ending Auction Idle Time:
   Using a similar example:

| Currently | $405.00 | First bid $10.00 |
|---|---|---|
| Quantity | 1 | # of bids 8 |
| Time left | Auction has ended. | |
| Started | May-14-03 16:12:29 PDT | |
| Ends | May-21-03 16:12:29 PDT | |
| Seller (Rating) | xxx | |

| Name | Bid | Date of Bid | Time Diff (days) |
|---|---|---|---|
| Auction End | | May-21-03 16:12:29 PDT | -- |
| Bidder 1 | 405.00 | May-20-03 15:19:33 PDT | Δ = 0.962 |
| Bidder 7 | 310.00 | May-20-03 15:17:45 PDT | Δ = 0.0013 |
| Bidder 6 | 200.00 | May-20-03 15:16:56 PDT | Δ = 0.0005 |
| Bidder 5 | 100.21 | May-15-03 07:27:35 PDT | Δ = 5.674 |
| Bidder 4 | 50.02 | May-15-03 07:26:31 PDT | Δ = 0.0013 |
| Bidder 3 | 37.03 | May-15-03 07:25:48 PDT | Δ = 0.0009 |
| Bidder 2 | 400.00 | May-14-03 21:54:42 PDT | Δ = 0.416 |
| Bidder 1 | 10.00 | May-14-03 19:38:53 PDT | Δ = 0.099 |

N.B.: the total number of bids for this auction $\geq 2$ for this 7-day auction. From the column of Time Differences above, the maximum idle time value, after the first bid was placed, is 5.674 days. This value $I_E$. So, the weighting formula, given this example, looks like:

$$W_6 = k - N_6 \cdot (5.674 - 0.40 \cdot 7) = k - N_6 \cdot (5.674 - 2.80)$$

or, $$W_6 = 1 - \frac{1}{14} \cdot (2.874) = 0.79471,$$

if the constant value k=1 and $$N_3 = \frac{1}{14}$$

as the weighting constants for this constraint.
Once the weighting factors for a given auction in the data set are computed, the average factor weighting for that auction is computed using the weighting average formula:

$$\overline{W}_i = \frac{\sum_{j=1}^{6} W_j}{6}.$$

Auction optimization system 40 then computes the average factor weightings for all auctions in the data set in the same manner. FIGS. 20 and 21 illustrate the process of normalizing the weighted final auction price data to conventional stock price data. That is, FIG. 20 illustrates the weighted final auction price over time. The plot in FIG. 20 illustrates use of 6-hour or ¼-day intervals. Accordingly, normalizing on each interval by using the above formula $$\overline{P} = \frac{\sum_{1} P_i \cdot \overline{W}_i}{\sum_{1} \overline{W}_i}$$

yields the graph illustrated in FIG. 21. Each 't-cross' in FIG. 21 illustrates where the highs and lows for the final auction prices of all auctions during the corresponding time interval, while the intersection point is the normalized weighted price F. As discussed above, after normalization of the data in this manner, a predicted final auction price, as well as an auction plan, may be computed as described above.

Although the present invention has been described relative to specific embodiments, it is not so limited. Many modifications and variations of the embodiments described above will become apparent. For example, although the auction optimization system 40 has been described as using specific constant values, the constant values can be varied to achieve a variety of behaviors and objectives. In addition, the specific, individual factor weightings described above are only one of many possible factor weightings. For example, alternative factors can be used to weight each auction, such as the number of bids in the last 24 hours, or the temporal proximity of the end of the completed auction to the current time. Furthermore, other changes in the details, steps and arrangement of various elements may be made by those of ordinary skill in the art without departing from the scope of the present invention. For example, the functionality of auction optimization system 40 may be integrated into, and be a part of, the functionality of on-line auction facility 30. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. A method facilitating the configuration of one or more parameters associated with an auction for an item, the method comprising:
   receiving, by one or more computing devices each comprising a processor, a memory and computer-program code stored in a computer-readable medium, historical auction data characterizing a plurality of completed auctions for an item of interest, the historical auction data comprising bid histories for each of the plurality of completed auctions;
   determining, by the one or more computing devices, based on analysis of respective bid histories, a weighting value for each of the completed auctions characterizing the relevance of each completed auction to the computation of at least one suggested auction parameter for a contemplated auction for the item of interest, wherein the determining step for each of the completed auctions comprises:
      computing component factor weightings for two or more of any of a total number of bids, a number of bids placed during a last time period of an auction, a largest change in bid amount, a timing of higher bids, an absolute idle time between start of auction and first bid, and an absolute idle time during middle and end of auction period; and aggregating the component factor weightings to create the weighting value for the completed auction;

analyzing, by the one or more computing devices, the historical auction data, based in part on the determined weighting values of each of the completed auctions;

computing at least one suggested auction parameter, wherein contributions of the completed auctions to computation of the at least one suggested auction parameter is based on the weighting values of each of the completed auctions; and generating, by the one or more computing devices, a report including the at least one suggested auction parameter for the contemplated auction for the item of interest.

2. The method of claim 1 wherein the suggested auction parameter is a suggested start price for the contemplated auction.

3. A method facilitating prediction of a final auction price for an item of interest, the method comprising:

receiving, by one or more computing devices each comprising a processor, a memory and computer-program code stored in a computer-readable medium, auction information characterizing a plurality of completed auctions for an item of interest, the auction information, for each completed auction, comprising a final auction price, an auction end time, and at least one additional auction attribute;

determining, by the one or more computing devices, based on analysis of respective bid histories corresponding to the plurality of completed auctions, relevance weighting values for the completed auctions relative to a contemplated auction for the item of interest, wherein the relevance weighting value for each of the completed auctions characterizes the relevance of each completed auction to the computation of a final auction price for a contemplated auction for the item of interest, and wherein the determining step for each of the completed auctions comprises:

computing component factor weightings for two or more of any of a total number of bids, a number of bids placed during a last time period of an auction, a largest change in bid amount, a timing of higher bids, an absolute idle time between start of auction and first bid, and an absolute idle time during middle and end of auction period; and aggregating the component factor weightings to create the weighting value for the completed auction;

constructing, by the one or more computing devices, a financial analysis model based on the auction information by:

segregating, based on associated auction end times, the final auction prices into corresponding time intervals;

weighting the final auction prices by corresponding relevance weighting values; and computing the average, weighted final auction price and volume in each time interval; and predicting, by the one or more computing devices, an estimated final auction price in the contemplated auction for the item of interest based on the financial analysis model.

4. The method of claim 3 further comprising computing a suggested starting price for the item of interest.

5. The method of claim 3 wherein the at least one additional auction attribute comprises the number of bids in each of the completed auctions.

6. The method of claim 3 wherein the at least one additional auction attribute comprises the idle time between the auction start and the first bid.

7. The method of claim 3 wherein the at least one additional auction attribute comprises the number of bids placed within a predetermined amount of time from the end of the auction.

8. The method of claim 3 wherein the at least one additional auction attribute comprises the highest price difference between two consecutive bids.

9. A method facilitating the configuration of one or more parameters associated with an auction for an item of interest, the method comprising:

receiving, by one or more computing devices each comprising a processor, a memory and computer-program code stored in a computer-readable medium, historical auction data characterizing a plurality of completed auctions for an item of interest, the auction information, for each completed auction, comprising a final auction price, an auction end time, and at least one additional auction attribute;

determining, by the one or more computing devices, based on analysis of respective bid histories corresponding to the plurality of completed auctions, relevance weighting values for the completed auctions, wherein the relevance weighting value for each of the completed auctions characterizes the relevance of each completed auction to the computation of a final auction price for a contemplated auction for the item of interest, and wherein the determining step for each of the completed auctions comprises:

computing component factor weightings for two or more of any of a total number of bids, a number of bids placed during a last time period of an auction, a largest change in bid amount, a timing of higher bids, an absolute idle time between start of auction and first bid, and an absolute idle time during middle and end of auction period; and aggregating the component factor weightings to create the relevance weighting value for the completed auction;

weighting, by the one or more computing devices, final auction prices of the completed auctions by respective weighting values;

constructing, by the one or more computing devices, a financial analysis model based on the auction information by:

segregating, based on associated auction end times, the final auction prices into corresponding time intervals;

weighting the final auction prices by corresponding relevance weighting values; and computing the average, weighted final auction price and volume in each time interval;

predicting, by the one or more computing devices, an estimated final auction price for the item of interest based on the financial analysis model;

computing, by the one or more computing devices, a suggested starting price for a contemplated auction for the item of interest based on the estimated final auction price and the historical auction data; and generating, by the one or more computing devices, a report including the suggested starting price.

10. The method of claim 9 further comprising:

analyzing the historical auction data and the weighted final auction prices; and computing at least one additional suggested auction parameter that maximizes final auction price of a contemplated auction.

11. The method of claim 9 wherein the at least one additional suggested auction parameter is a suggested auction duration.

12. The method of claim 9 wherein the at least one additional suggested auction parameter is a suggested auction start time.

13. The method of claim 9 wherein the at least one additional suggested auction parameter is a suggested reserve price.

14. The method of claim 9 wherein the at least one additional suggested auction parameter is a suggested buy-it-now price.

15. The method of claim 9 wherein the at least one additional suggested auction parameter is a suggested number of items.

16. An auction optimization system facilitating the configuration of an auction, the auction optimization system comprising:
- a memory;
- a processor; and
- an application server program stored in a computer-readable medium comprising instructions operative, when executed, to cause the processor to:
  - receive auction information characterizing a plurality of completed auctions for an item of interest;
  - determine, based on analysis of respective bid histories corresponding to each of the plurality of completed auctions, relevance weighting values for the completed auctions, wherein to determine the relevance weighting values for each of the completed auctions, the instructions are operative to cause the processor to:
    - compute component factor weightings for two or more of any of a total number of bids, a number of bids placed during a last time period of an auction, a largest change in bid amount, a timing of higher bids, an absolute idle time between start of auction and first bid, and an absolute idle time during middle and end of auction period; and
    - aggregate the component factor weightings to create the weighting value for the completed auction;
  - weight final auction prices of the completed auctions by respective weighting values;
  - analyze the auction information and the weighted final auction prices;
  - compute at least one suggested auction parameter that maximizes final auction price of a contemplated auction for the item of interest, wherein contributions of the completed auctions to computation of the at least one suggested auction parameter is based on the weighting values of each of the completed auctions; and
  - generate a report including the at least one suggested auction parameter for the contemplated auction.

17. The auction optimization system of claim 16 further comprising a data warehouse maintaining auction information characterizing a plurality of completed auctions.

18. The auction optimization system of claim 16 wherein the application server program further comprises instructions operative to cause the processor to interact with a client device to receive auction information from an on-line auction facility.

* * * * *